(12) United States Patent
Hosaka

(10) Patent No.: US 8,426,537 B2
(45) Date of Patent: Apr. 23, 2013

(54) SOLID CATALYST COMPONENT AND CATALYST FOR POLYMERIZATION OF OLEFINS, AND PROCESS FOR PRODUCTION OF OLEFIN POLYMERS USING SAME

(75) Inventor: Motoki Hosaka, Chigasaki (JP)

(73) Assignee: Toho Titanium Co., Ltd., Chigasaki-shi (JP)

( * ) Notice: Subject to any disclaimer, the term of this patent is extended or adjusted under 35 U.S.C. 154(b) by 0 days.

(21) Appl. No.: 13/120,027

(22) PCT Filed: Feb. 26, 2010

(86) PCT No.: PCT/JP2010/053044
§ 371 (c)(1),
(2), (4) Date: Jul. 7, 2011

(87) PCT Pub. No.: WO2010/106888
PCT Pub. Date: Sep. 23, 2010

(65) Prior Publication Data
US 2012/0004378 A1 Jan. 5, 2012

(30) Foreign Application Priority Data

Mar. 17, 2009 (JP) ................. 2009-064277
Mar. 17, 2009 (JP) ................. 2009-064281

(51) Int. Cl.
  *B01J 31/00* (2006.01)
  *B01J 21/00* (2006.01)
  *C08F 4/44* (2006.01)
  *C08F 4/06* (2006.01)

(52) U.S. Cl.
  USPC ........ 526/116; 502/158; 502/232; 526/124.9; 526/125.3; 526/126; 526/128

(58) Field of Classification Search .......... 502/116, 502/158, 232; 526/126, 128, 124.9, 125.3
See application file for complete search history.

(56) References Cited

U.S. PATENT DOCUMENTS 5,147,839 A  9/1992 Fujita et al.
5,494,872 A  2/1996 Hosaka et al.
(Continued)

FOREIGN PATENT DOCUMENTS

JP   3 234707    10/1991
JP   2006 169283  6/2006
(Continued)

OTHER PUBLICATIONS

U.S. Appl. No. 13/289,728 filed Nov. 4, 2011, Hosaka et al.
(Continued)

*Primary Examiner* — David W Wu
*Assistant Examiner* — Elizabeth Eng
(74) *Attorney, Agent, or Firm* — Oblon, Spivak, McClelland, Maier & Neustadt, L.L.P.

(57) ABSTRACT

A solid catalyst component for olefin polymerization is produced by causing (a) a solid component that includes magnesium, titanium, a halogen, and an electron donor, (b) an aminosilane compound shown by the following general formula (1), and (c) at least one organosilicon compound selected from an organosilicon compound shown by the following general formula (2-A) and an organosilicon compound shown by the following general formula (2-B) to come in contact with each other. A polymer having high stereoregularity is produced in high yield while achieving a high melt flow rate due to hydrogen by polymerizing an olefin in the presence of a catalyst that includes the solid catalyst component.

$$R^1{}_n Si(NR^2R^3)_{4-n} \quad (1)$$

$$[CH_2{=}CH{-}(CH_2)_l]_q SiR^4{}_{4-q} \quad (2\text{-}A)$$

$$R^5 Si(OR^6)_{4-s} \quad (2\text{-}B)$$

19 Claims, 1 Drawing Sheet

U.S. PATENT DOCUMENTS

| | | | |
|---|---|---|---|
| 5,498,770 | A | 3/1996 | Hosaka et al. |
| 5,684,173 | A | 11/1997 | Hosaka et al. |
| 5,932,510 | A | 8/1999 | Hosaka et al. |
| 5,965,478 | A | 10/1999 | Goto et al. |
| 6,034,188 | A * | 3/2000 | Sano et al. ............... 526/124.6 |
| 6,156,690 | A | 12/2000 | Hosaka |
| 6,228,793 | B1 | 5/2001 | Hosaka et al. |
| 6,664,209 | B1 | 12/2003 | Hosaka |
| 6,670,497 | B2 | 12/2003 | Tashino et al. |
| 6,770,586 | B2 | 8/2004 | Tashino et al. |
| 6,855,656 | B2 | 2/2005 | Hosaka et al. |
| 7,005,399 | B2 | 2/2006 | Hosaka |
| 7,141,634 | B2 | 11/2006 | Hosaka et al. |
| 7,208,435 | B2 | 4/2007 | Hosaka et al. |
| 7,704,910 | B2 | 4/2010 | Hosaka et al. |
| 8,247,504 | B2 * | 8/2012 | Yano et al. ............... 526/125.3 |
| 2005/0054773 | A1 | 3/2005 | Hosaka et al. |
| 2009/0253873 | A1 * | 10/2009 | Hosaka et al. ............ 526/125.3 |
| 2009/0253874 | A1 | 10/2009 | Hosaka et al. |
| 2010/0190938 | A1 | 7/2010 | Yano et al. |
| 2010/0190942 | A1 * | 7/2010 | Hosaka et al. ............... 526/128 |

FOREIGN PATENT DOCUMENTS

| | | |
|---|---|---|
| JP | 2007 224097 | 9/2007 |
| JP | 2007 326886 | 12/2007 |
| JP | 2007 326887 | 12/2007 |
| WO | WO 2006064718 A1 * | 6/2006 |
| WO | 2006 129773 | 12/2006 |
| WO | 2007 026903 | 3/2007 |
| WO | 2008 050883 | 5/2008 |

OTHER PUBLICATIONS

International Search Report Issued May 11, 2010 in PCT/JP10/053044 filed Feb. 26, 2010.

Office Action issued Sep. 6, 2012, in Chinese Application No. 2010-80002665.6 with English translation.

* cited by examiner

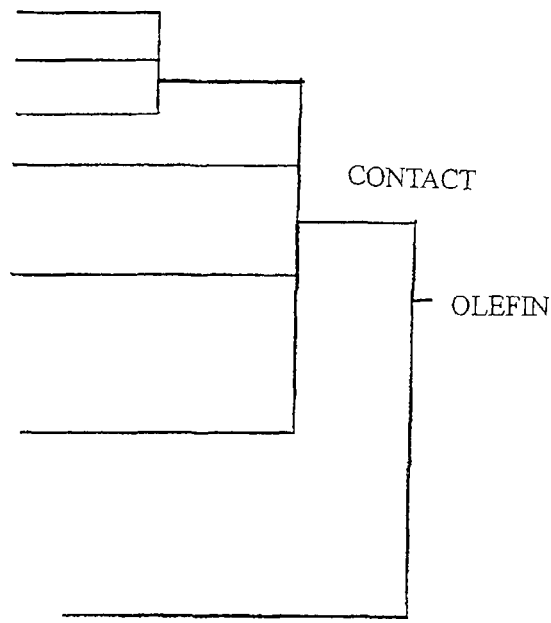

SOLID CATALYST COMPONENT AND CATALYST FOR POLYMERIZATION OF OLEFINS, AND PROCESS FOR PRODUCTION OF OLEFIN POLYMERS USING SAME

TECHNICAL FIELD

The present invention relates to a solid catalyst component for olefin polymerization and a catalyst that can produce a polymer having high stereoregularity in high yield while achieving an excellent hydrogen response (i.e., a high melt flow rate is achieved with a reduced amount of hydrogen), and also relates to a process for producing an olefin polymer or copolymer using the same.

BACKGROUND ART

A solid catalyst component that contains magnesium, titanium, an electron donor compound, and a halogen as essential components has been used when polymerizing an olefin (e.g., propylene). Various processes have been proposed for polymerizing or copolymerizing an olefin in the presence of an olefin polymerization catalyst that contains the solid catalyst component, an organoaluminum compound, and an organosilicon compound. A polymer produced by utilizing such a catalyst has been used for various applications (e.g., molded products for vehicles and household electric appliances, containers, and films). These products are produced by melting a polymer powder obtained by polymerization, and molding the molten polymer using a molding machine. When producing a large injection-molded product, the molten polymer may be required to have a high melt flow rate (MFR). When producing a desired amount of copolymer in a copolymerization reactor, and directly producing an olefin-based thermoplastic elastomer (TPO) in the reactor without adding another copolymer (i.e., production of a reactor-made TPO by direct polymerization) in order to reduce the cost of a high-performance block copolymer used as an automotive material, a melt flow rate of 200 or more may be required in the homopolymerization stage in order to produce a product that has a high melt flow rate and facilitates injection molding. Therefore, studies have been extensively conducted aimed at increasing the melt flow rate of the resulting polymer. The melt flow rate of a polymer varies depending on the molecular weight of the polymer. When polymerizing propylene, hydrogen is normally added as a molecular-weight modifier. A large amount of hydrogen is normally added when producing a polymer having a low molecular weight (i.e., high melt flow rate). However, the amount of hydrogen that can be added is limited since the pressure that can be applied to the reactor (particularly a bulk polymerization reactor) is limited taking account of safety. When using vapor-phase polymerization, the partial pressure of monomers must be reduced when adding a large amount of hydrogen. In this case, the productivity decreases. Moreover, cost increases as a result of using a large amount of hydrogen.

For example, Patent Document 1 (WO2006/129773) discloses an aminosilane compound shown by $R^1{}_2Si(NHR^2)_2$ as an external electron donor compound used when polymerizing an olefin. Patent Document 1 discloses that a polymer having a high melt flow rate is obtained with a reduced amount of hydrogen by utilizing the aminosilane compound. However, when using the aminosilane compound disclosed in Patent Document 1 as an external electron donor compound when polymerizing an olefin, it is necessary to use a large amount of the aminosilane compound in order to obtain a polymer having desired properties. Therefore, the aminosilane compound disclosed in Patent Document 1 is industrially disadvantageous from the viewpoint of cost. Moreover, the stereoregularity of the polymer decreases although the MFR of the polymer is improved.

Patent Document 2 (JP-A-2007-326886) discloses an olefin polymerization catalyst component that contains a solid catalyst component and an organoaluminum compound, the solid catalyst component being produced by causing a vinylsilane compound and an organosilicon compound shown by $[R^1R^2N]Si(OR^3)_3$ to come in contact with a solid component that contains titanium, magnesium, and a halogen as essential components. Patent Document 3 (JP-A-2007-326887) discloses an olefin polymerization catalyst component that contains a solid catalyst component and an organoaluminum compound, the solid catalyst component being produced by causing a vinylsilane compound, an organosilicon compound shown by $[R^1R^2N]Si(OR^3)_3$, and an organosilicon compound shown by $R^4R^5{}_aSi(OR^6)_b$ to come in contact with a solid component that contains titanium, magnesium, and a halogen as essential components. These catalysts aim at producing a polymer having an improve MFR without using an external electron donor compound by causing a significantly small amount of aminosilane compound (as compared with the amount used during polymerization) to come in contact with the solid catalyst component that contains magnesium and titanium. However, it is difficult to produce a polymer having a high MFR using these catalysts. Moreover, a decrease in polymerization activity and stereoregularity of the polymer occurs.

Patent Document 4 (WO2007/026903) discloses an olefin polymerization catalyst component that contains a solid catalyst component and an organoaluminum compound, the solid catalyst component being produced by causing an organosilicon compound shown by $[CH_2=CH-(CH_2)_n]_qSiR^1{}_{4-q}$ to come in contact with a solid component that contains magnesium, titanium, and a halogen as essential components. High polymerization activity during polymerization is achieved by this catalyst. However, it is difficult to produce a polymer having a high MFR using this catalyst.

RELATED-ART DOCUMENT

Patent Document

Patent Document 1: WO2006/129773 (claims)
Patent Document 2: JP-A-2007-326886 (claims)
Patent Document 3: JP-A-2007-326887 (claims)
Patent Document 4: WO2007/026903 (claims)

SUMMARY OF THE INVENTION

Problems to be Solved by the Invention

An object of the invention is to provide a solid catalyst component for olefin polymerization and a catalyst that can produce a polymer having high stereoregularity in high yield while achieving an excellent hydrogen response (i.e., a high melt flow rate is achieved with a reduced amount of hydrogen), and a process for producing an olefin polymer using the same.

Means for Solving the Problems

In view of the above situation, the inventors conducted extensive studies, and found that a catalyst that includes a solid catalyst component obtained by causing a solid component that includes magnesium, titanium, a halogen atom, and an electron donor compound, an active hydrogen-containing aminosilane compound, and a specific organosilicon compound to come in contact with each other is suitable as a catalyst for polymerizing (copolymerizing) an olefin as compared with the above catalysts. This finding has led to the completion of the invention.

Specifically, the invention provides a solid catalyst component for olefin polymerization produced by causing (a) a solid component that includes magnesium, titanium, a halogen, and an electron donor, (b) an aminosilane compound shown by the following general formula (1), and (c) at least one organosilicon compound selected from an organosilicon compound shown by the following general formula (2-A) and an organosilicon compound shown by the following general formula (2-B) to come in contact with each other, $$R^1_n Si(NR^2R^3)_{4-n} \tag{1}$$

wherein $R^1$ individually represent a linear or branched alkyl group having 1 to 20 carbon atoms, a substituted or unsubstituted cycloalkyl group, a vinyl group, an allyl group, an aralkyl group, a substituted or unsubstituted phenyl group, a substituted or unsubstituted benzyl group, or a substituted or unsubstituted naphthyl group, $R^2$ individually represent a hydrogen atom, a linear or branched alkyl group having 1 to 20 carbon atoms, a substituted or unsubstituted cycloalkyl group, a vinyl group, an ally! group, or an aralkyl group, $R^3$ individually represent a linear or branched alkyl group having 1 to 20 carbon atoms, a substituted or unsubstituted cycloalkyl group, a vinyl group, an allyl group, or an aralkyl group, provided that $R^2$ and $R^3$ may bond to form a ring, n is an integer from 0 to 3, and at least one $NR^2R^3$ group is a secondary amino group that includes an N—H bond, $$[CH_2\!\!=\!\!CH\!-\!(CH_2)_1]_q SiR^4_{4-q} \tag{2-A}$$

wherein $R^4$ individually represent a hydrogen atom, a linear or branched alkyl group having 1 to 20 carbon atoms, a cycloalkyl group, an aryl group, a vinyl group, or a halogen atom, 1 is an integer from 0 to 5, and q is an integer from 1 to 4, provided that at least one $R^4$ represents an alkyl group having 2 to 20 carbon atoms, a cycloalkyl group, an aryl group, a vinyl group, or a halogen atom when q is 1, $$R^5 Si(OR^6)_{4-s} \tag{2-B}$$

wherein $R^5$ represents a linear or branched alkyl group having 1 to 12 carbon atoms, a cycloalkyl group, a phenyl group, a vinyl group, an allyl group, an aralkyl group, a linear or branched alkylamino group, or a polycyclic amino group, $R^6$ individually represent a linear or branched alkyl group having 1 to 4 carbon atoms, and s is an integer from 0 to 3.

The invention also provides an olefin polymerization catalyst including (A) the above solid catalyst component for olefin polymerization, (B) an organoaluminum compound shown by the following general formula (5), and (C) an optional external electron donor compound, $$R^8_p AlQ_{3-p} \tag{5}$$

wherein $R^8$ represents an alkyl group having 1 to 4 carbon atoms, Q represents a hydrogen atom or a halogen atom, and p is an integer from 1 to 3.

The invention also provides a process for producing an olefin polymer including polymerizing an olefin in the presence of the above olefin polymerization catalyst.

Effects of the Invention

A catalyst produced using the above solid catalyst component can produce a polymer having high stereoregularity in high yield, and achieves an excellent hydrogen response (i.e., a high melt flow rate is achieved with a reduced amount of hydrogen) as compared with known catalysts. Therefore, a general-purpose polyolefin can be provided at low cost due to a reduction in the amount of hydrogen used for polymerization, high catalytic activity, and the like. Moreover, the catalyst is expected to be useful for producing a high-performance olefin polymer. It is also possible to significantly reduce the amount of organosilicon compound that has been used as an external electron donor compound that is caused to come in contact with a solid catalyst component immediately before polymerizing an olefin by incorporating the organosilicon compound (external electron donor compound) in the solid catalyst component, so that the polymer production cost can be reduced.

BRIEF DESCRIPTION OF THE DRAWINGS

FIG. 1 is a flowchart showing a process for producing a polymerization catalyst according to one embodiment of the invention.

DESCRIPTION OF EXEMPLARY EMBODIMENTS

A solid catalyst component (A) (hereinafter may be referred to as "component (A)") according to one embodiment of the invention is produced by causing (a) a solid component that includes magnesium, titanium, a halogen, and an electron donor (hereinafter may be referred to as "component (a)"), (b) an aminosilane compound shown by the general formula (1) (hereinafter may be referred to as "component (b)"), and (c) at least one organosilicon compound selected from an organosilicon compound shown by the general formula (2-A) and an organosilicon compound shown by the general formula (2-B) (hereinafter may be referred to as "component (c)") to come in contact with each other. The solid catalyst component (A) is preferably produced by causing the component (a), the component (b), the component (c), and (e) an organoaluminum compound shown by the general formula (3) (hereinafter may be referred to as "component (e)") to come in contact with each other.

Magnesium Compound (i)

The solid component (a) may be produced by causing (i) a magnesium compound (hereinafter may be referred to as "component (i)"), (ii) a titanium compound (hereinafter may be referred to as "component (ii)"), and (iii) an electron donor compound (hereinafter may be referred to as "component (iii)") to come in contact with each other. The solid component (a) may also be produced by causing the component (i), the component (ii), the component (iii), and (iv) a hydrocarbon solvent (hereinafter may be referred to as "component (iv)") to come in contact with each other.

Examples of the magnesium compound (i) used to produce the solid component include a magnesium dihalide, a dialkylmagnesium, an alkylmagnesium halide, a dialkoxymagnesium, a diaryloxymagnesium, an alkoxymagnesium halide, a fatty acid magnesium, and the like. Among these, a magnesium dihalide, a mixture of a magnesium dihalide and a dialkoxymagnesium, and a dialkoxymagnesium are preferable, and a dialkoxymagnesium is particularly preferable. Specific examples of these compounds include dimethoxymagnesium, diethoxymagnesium, dipropoxymagnesium, dibutoxymagnesium, ethoxymethoxymagnesium, ethoxypropoxymagnesium, butoxyethoxymagnesium, and the like. Among these, diethoxymagnesium is particularly preferable.

A dialkoxymagnesium may be produced by reacting magnesium metal with an alcohol in the presence of a halogen-containing organic metal compound or the like. The above dialkoxymagnesiums may be used either individually or in combination. It is preferable to use a dialkoxymagnesium in the form of granules or a powder. The dialkoxymagnesium may be amorphous or spherical. When using a spherical dialkoxymagnesium, for example, a polymer powder having an excellent particle shape and a narrow particle size distribution is obtained. This improves the handling capability of the polymer powder during polymerization, and prevents a situation in which a filter of a polymer separation apparatus is clogged by fine particles contained in the polymer powder, for example.

The spherical dialkoxymagnesium need not necessarily be completely spherical, but may be oval or potato-shaped. Specifically, the spherical dialkoxymagnesium particles may have a ratio (L/W) of the major axis diameter (L) to the minor axis diameter (W) of 3 or less, preferably 1 to 2, and more preferably 1 to 1.5.

The dialkoxymagnesium may have an average particle size of 1 to 200 μm. The dialkoxymagnesium preferably has an average particle size of 5 to 150 μm. When using a spherical dialkoxymagnesium, the average particle size of the spherical dialkoxymagnesium is 1 to 100 μm, preferably 5 to 50 μm, and more preferably 10 to 40 μm. It is preferable to use a dialkoxymagnesium that has a low fine powder content and a low coarse powder content, and has a narrow particle size distribution. Specifically, it is preferable to use a dialkoxymagnesium that contains particles having a particle size of 5 μm or less in an amount of 20% or less, and more preferably 10% or less, and contains particles having a particle size of 100 μm or more in an amount of 10% or less, and more preferably 5% or less. The particle size distribution "D90/D10" (where, D90 is a particle size corresponding to 90% in the cumulative particle size distribution curve, and D10 is a particle size corresponding to 10% in the cumulative particle size distribution curve) of the dialkoxymagnesium is 3 or less, and preferably 2 or less.

A spherical dialkoxymagnesium may be produced by the method disclosed in JP-A-58-4132, JP-A-62-51633, JP-A-3-74341, JP-A-4-368391, or JP-A-8-73388, for example.

Titanium Compound (ii)

The titanium compound (ii) used to produce the solid material (a) is at least one compound selected from tetravalent titanium halides and alkoxytitanium halides. Specific examples of the titanium halides include titanium tetrahalides such as titanium tetrachloride, titanium tetrabromide, and titanium tetraiodide. Specific examples of the alkoxytitanium halides include methoxytitanium trichloride, ethoxytitanium trichloride, propoxytitanium trichloride, n-butoxytitanium trichloride, dimethoxytitanium dichloride, diethoxytitanium dichloride, dipropoxytitanium dichloride, di-n-butoxytitanium dichloride, trimethoxytitanium chloride, triethoxytitanium chloride, tripropoxytitanium chloride, tri-n-butoxytitanium chloride, and the like. Among these, titanium tetrahalides (particularly titanium tetrachloride) are preferable. These titanium compounds may be used either individually or in combination.

Electron Donor Compound (iii)

The electron donor compound (iii) used to produce the solid component (a) is an organic compound that includes an oxygen atom or a nitrogen atom. Examples of the electron donor compound (iii) include alcohols, phenols, ethers, esters, ketones, acid halides, aldehydes, amines, amides, nitriles, isocyanates, and the like.

Specific examples of the electron donor compound (iii) include alcohols such as methanol, ethanol, propanol, and 2-ethylhexanol, phenols such as phenol and cresol, ethers such as methyl ether, ethyl ether, propyl ether, butyl ether, amyl ether, diphenyl ether, 9,9-bis(methoxymethyl)fluorene, 2-isopropyl-2-isopentyl-1,3-dimethoxypropane, 2,2-diisobutyl-1,3-dimethoxypropane, 2,2-dicyclohexyl-1,3-dimethoxypropane, 2,2-bis(cyclohexylmethyl)-1,3-dimethoxypropane, 2-cyclohexyl-2-isopropyl-1,3-dimethoxypropane, 2-isopropyl-2-sec-butyl-1,3-dimethoxypropane, 2,2-diphenyl-1,3-dimethoxypropane, and 2-cyclopentyl-2-isopropyl-1,3-dimethoxypropane, monocarboxylic acid esters such as methyl formate, ethyl acetate, vinyl acetate, propyl acetate, octyl acetate, cyclohexyl acetate, ethyl propionate, ethyl butyrate, ethyl benzoate, propyl benzoate, butyl benzoate, octyl benzoate, cyclohexyl benzoate, phenyl benzoate, methyl 4-methylbenzoate, ethyl 4-methylbenzoate, methyl p-methoxybenzoate, and ethyl p-methoxybenzoate, malonic acid diesters such as dimethyl diisopropylmalonate, diethyl diisopropylmalonate, dipropyl diisopropylmalonate, diisopropyl diisopropylmalonate, dibutyl diisopropylmalonate, diisobutyl diisopropylmalonate, dineopentyl diisopropylmalonate, dimethyl diisobutylmalonate, diethyl diisobutylmalonate, dipropyl diisobutylmalonate, diisopropyl diisobutylmalonate, dibutyl diisobutylmalonate, diisobutyl diisobutylmalonate, dineopentyl diisobutylmalonate, dimethyl diisopentylmalonate, diethyl diisopentylmalonate, dipropyl diisopentylmalonate, diisopropyl diisopentylmalonate, dibutyl diisopentylmalonate, diisobutyl diisopentylmalonate, dineopentyl diisopentylmalonate, dimethyl isopropylisobutylmalonate, diethyl isopropylisobutylmalonate, dipropyl isopropylisobutylmalonate, diisopropyl isopropylisobutylmalonate, dibutyl isopropylisobutylmalonate, diisobutyl isopropylisobutylmalonate, dineopentyl isopropylisobutylmalonate, dimethyl isopropylisopentylmalonate, diethyl isopropylisopentylmalonate, dipropyl isopropylisopentylmalonate, diisopropyl isopropylisopentylmalonate, dibutyl isopropylisopentylmalonate, diisobutyl isopropylisopentylmalonate, and dineopentyl isopropylisopentylmalonate, succinic acid diesters such as diethyl 2,3-diethylsuccinate, diethyl 2,3-dipropylsuccinate, diethyl 2,3-diisopropylsuccinate, diethyl 2,3-dibutylsuccinate, diethyl 2,3-diisobutylsuccinate, diethyl 2,3-di-t-butylsuccinate, dibutyl 2,3-diethylsuccinate, dibutyl 2,3-dipropylsuccinate, dibutyl 2,3-diisopropylsuccinate, dibutyl 2,3-dibutylsuccinate, dibutyl 2,3-diisobutylsuccinate, and dibutyl 2,3-di-t-butylsuccinate, glutaric acid diesters such as diisobutyl 3-methylglutarate, diisobutyl 3-phenylglutarate, diethyl 3-ethylglutarate, diethyl 3-n-propylglutarate, diethyl 3-isopropylglutarate, diethyl 3-isobutylglutarate, diethyl 3-phenylglutarate, diisobutyl 3-ethylglutarate, diisobutyl 3-isopropylglutarate, diisobutyl 3-isobutylglutarate, diethyl 3-(3,3,3-trifluoropropyl)glutarate, diethyl 3-cyclohexylmethylglutarate, diethyl 3-t-butylglutarate, diethyl 3,3-dimethylglutarate, diisobutyl 3,3-dimethylglutarate, diethyl 3-methyl-3-isobutylglutarate, and diethyl 3-methyl-3-t-butylglutarate, cyclohexenedicarboxylic acid diesters such as diethyl 1-cyclohexene-1,2-dicarboxylate, di-n-propyl 1-cyclohexene-1,2-dicarboxylate, di-n-butyl 1-cyclohexene-1,2-dicarboxylate, diisobutyl 1-cyclohexene-1,2-dicarboxylate, dineopentyl 1-cyclohexene-1,2-dicarboxylate, and bis(2,2-dimethylhexyl) 1-cyclohexene-1,2-dicarboxylate, cyclohexanedicarboxylic acid diesters such as diethyl cyclohexane-1,2-dicarboxylate, di-n-propyl cyclohexane-1,2-dicarboxylate, di-n-butyl cyclohexane-1,2-dicarboxylate, diisobutyl cyclohexane-1,2-dicarboxylate, dineopentyl cyclohexane-1,2-dicarboxylate, bis(2,2-dimethylhexyl)cyclohexane-1,2-dicarboxylate, diethyl 3-methylcyclohexane-1,2-dicarboxylate, diethyl 4-methylcyclohexane-1,2-dicarboxylate, diethyl cyclohexane-1,1-dicarboxylate, di-n-propyl cyclohexane-1,1-dicarboxylate, di-n-butyl cyclohexane-1,1-dicarboxylate, diisobutyl cyclohexane-1,1-dicarboxylate, dineopentyl cyclohexane-1,1-dicarboxylate, bis(2,2-dimethylhexyl)cyclohexane-1,1-dicarboxylate, diethyl 3-methylcyclohexane-1,1-dicarboxylate, and diethyl 4-methylcyclohexane-1,1-dicarboxylate, maleic acid diester such as diethyl maleate and dibutyl maleate, adipic acid diesters such as dimethyl adipate, diethyl adipate, dipropyl adipate, diisopropyl adipate, dibutyl adipate, diisodecyl adipate, and dioctyl adipate, phthalic acid diesters such as dimethyl phthalate, diethyl phthalate, dipropyl phthalate, diisopropyl phthalate, dibutyl phthalate, diisobutyl phthalate, ethylmethyl phthalate, methyl isopropyl phthalate, ethylpropyl phthalate, ethylbutyl phthalate, ethylisobutyl phthalate, dipentyl phthalate, diisopentyl phthalate, dineopentyl phthalate, dihexyl phthalate, diheptyl phthalate, dioctyl phthalate, bis(2,2-dimethylhexyl)phthalate, bis(2-ethylhexyl)phthalate, dinonyl phthalate, diisodecyl phthalate, bis(2,2-dimethylheptyl)phthalate, butylisohexyl phthalate, butyl(2-ethylhexyl) phthalate, pentylhexyl phthalate, pentylisohexyl phthalate, isopentylheptyl phthalate, pentyl (2-ethylhexyl)phthalate, pentylisononyl phthalate, isopentyldecyl phthalate, pentylundecyl phthalate, isopentylisohexyl phthalate, hexyl(2,2-dimethylhexyl) phthalate, hexylisononyl phthalate, hexyldecyl phthalate, heptyl(2-ethylhexyl)phthalate, heptylisononyl phthalate, heptyldecyl phthalate, (2-ethylhexyl)isononyl phthalate, dineopentyl 4-methylphthalate, dineopentyl 4-ethylphthalate, dineopentyl 4,5-dimethylphthalate, dineopentyl 4,5-diethylphthalate, diethyl 4-chlorophthalate, dibutyl 4-chlorophthalate, dineopentyl 4-chlorophthalate, diisobutyl 4-chlorophthalate, diisohexyl 4-chlorophthalate, diisooctyl 4-chlorophthalate, diethyl 4-bromophthalate, dibutyl 4-bromophthalate, dineopentyl 4-bromophthalate, diisobutyl 4-bromophthalate, diisohexyl 4-bromophthalate, diisooctyl 4-bromophthalate, diethyl 4,5-dichlorophthalate, dibutyl 4,5-dichlorophthalate, diisohexyl 4,5-dichlorophthalate, and diisooctyl 4,5-dichlorophthalate, ketones such as acetone, methyl ethyl ketone, methyl butyl ketone, acetophenone, and benzophenone, acid chlorides such as phthalic dichloride and terephthalic dichloride, aldehydes such as acetaldehyde, propionaldehyde, octyl aldehyde, and benzaldehyde, amines such as methylamine, ethylamine, tributylamine, piperidine, aniline, and pyridine, amides such as 2,6-substituted piperidines such as 2,2,6,6-tetramethylpiperidine, 2,5-substituted piperidines, substituted methylenediamines such as N,N,N',N'-tetramethylmethylenediamine, olefinic acid amides and stearic acid amides, nitriles such as acetonitrile, benzonitrile, and tolunitrile, and isocyanates such as methyl isocyanate and ethyl isocyanate.

Among the above electron donor compounds, esters (particularly dicarboxylic acid diesters) are preferable. It is particularly preferable to use phthalic acid diesters, malonic acid diester derivatives, and maleic acid diesters.

The above esters may be used in combination. In this case, it is desirable to use esters that differ in the total number of carbon atoms of alkyl groups by 4 or more.

The solid component (a) is preferably produced by causing the components (i), (ii), and (iii) to come in contact with each other in the presence of the hydrocarbon solvent (iv). Specific examples of the hydrocarbon solvent (iv) include saturated hydrocarbon compounds such as pentane, hexane, heptane, octane, nonane, decane, and cyclohexane, aromatic hydrocarbon compounds such as benzene, toluene, xylene, and ethylbenzene, halogenated hydrocarbon compounds such as methylene chloride and 1,2-dichlorobenzene, ethers such as diethyl ether, and the like. Among these, aromatic hydrocarbon compounds that are liquid at room temperature (e.g., toluene and xylene), and saturated hydrocarbon compounds that are liquid at room temperature (e.g., hexane, heptane, and cyclohexane) are preferably used. These solvents may be used either individually or in combination.

The solid component (a) is particularly preferably obtained by producing a suspension using the components (i), (iii), and (iv), causing a mixture prepared using the components (ii) and (iv) to come in contact with the suspension, and reacting the components.

Other Components

It is preferable to use (v) a polysiloxane (hereinafter may be referred to as "component (v)") in addition to the above components when producing the solid component (a). The stereoregularity or the crystallinity of the resulting polymer can be improved, and the amount of fine powder contained in the resulting polymer can be reduced by utilizing the polysiloxane. The term "polysiloxane" refers to a polymer that includes a siloxane bond (—Si—O bond) in the main chain, and is also referred to as "silicone oil". The polysiloxane used in the invention is a chain-like, partially hydrogenated, cyclic, or modified polysiloxane that is liquid or viscous at room temperature, and has a viscosity (25° C.) of 0.02 to 100 cm$^2$/s (2 to 1000 cSt).

Examples of the chain-like polysiloxane include dimethylpolysiloxane and methylphenylpolysiloxane. Examples of the partially hydrogenated polysiloxane include methyl hydrogen polysiloxane having a hydrogenation rate of 10 to 80%. Examples of the cyclic polysiloxane include hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane. Examples of the modified polysiloxane include higher fatty acid group-substituted dimethylsiloxane, epoxy group-substituted dimethylsiloxane, and polyoxyalkylene group-substituted dimethylsiloxane. Among these, decamethylcyclopentasiloxane and dimethylpolysiloxane are preferable, and decamethylcyclopentasiloxane is particularly preferable.

Production of Solid Component (a)

The solid component (a) is produced by causing the components (i), (ii), and (iii) (and optionally the component (iv) or (v)) to come in contact with each other. The solid component (a) is produced as follows. Specifically, the magnesium compound (i) is suspended in the tetravalent titaniumhalidecompound (ii) or the hydrocarbon solvent (iv), and caused to come in contact with the electron donor compound (iii) (e.g., phthalic acid diester) (and optionally the tetravalent titaniumhalidecompound (ii)). A spherical solid component (a) having a sharp particle size distribution may be obtained using a spherical magnesium compound. A spherical solid component (a) having a sharp particle size distribution may also be obtained without using a spherical magnesium compound by forming particles by a spray drying method that sprays and dries a solution or a suspension using a spray device, for example.

The components are caused to come in contact with each other in an inert gas atmosphere with stirring in a vessel equipped with a stirrer from which water and the like have been removed. The contact temperature employed when causing the components to come in contact with each other may be either the same as or different from the reaction temperature. When merely causing the components to come into contact with each other, and stirring (mixing) the components, or dispersing or suspending the components to effect modification, the components may be caused to come in contact with each other at a relatively low temperature around room temperature. When reacting the components that have been caused to come in contact with each other, it is preferable to employ a temperature in the range from 40 to 130° C. If the reaction temperature is less than 40° C., the reaction may not proceed sufficiently, so that the resulting solid catalyst component may exhibit insufficient performance. If the reaction temperature exceeds 130° C., it may be difficult to control the reaction due to significant vaporization of the solvent, for example. The reaction time is 1 minute or more, preferably 10 minutes or more, and still more preferably 30 minutes or more.

The solid component (a) is preferably produced by suspending the component (i) in the component (iv), causing the component (ii) to come in contact with the suspension, causing the mixture to come in contact with the components (iii) and (iv), and reacting the components, or suspending the component (i) in the component (iv), causing the component (iii) to come in contact with the suspension, causing the component (ii) to come in contact with the mixture, and reacting the components. The solid component (a) thus prepared may be caused to come in contact with the component (ii) or the components (ii) and (iii) at least once to improve the performance of the resulting solid catalyst component. This operation is preferably performed in the presence of the aromatic hydrocarbon compound (iv).

The solid component (a) may also preferably be produced by suspending the components (i) and (iii) in the aromatic hydrocarbon solvent (iv) having a boiling point of 50 to 150° C., causing a mixture of the components (ii) and (iv) to come in contact with the suspension, and reacting the components.

The solid component (a) may preferably be produced as follows. Specifically, the components (i) and (iii) are suspended in the aromatic hydrocarbon compound (iv) having a boiling point of 50 to 150° C. The resulting suspension is added to a mixture of the component (iii) and the hydrocarbon solvent (iv) having a boiling point of 50 to 150° C. The resulting mixture is heated, and reacted (primary reaction). After completion of the reaction, the resulting solid is washed with a hydrocarbon compound that is liquid at room temperature to obtain a solid product. Note that the component (ii) and the hydrocarbon solvent (iv) having a boiling point of 50 to 150° C. may be caused to come in contact with the solid product at −20 to 100° C. The mixture may be heated, and reacted (secondary reaction). After completion of the reaction, the mixture may be washed with a hydrocarbon compound that is liquid at room temperature once to ten times to obtain a solid component (a).

The solid component (a) is more preferably produced by suspending the component (i) in the component (iv), adding a mixture of the components (ii) and (iv) to the suspension, adding the component (iii) to the resulting mixture, and heating the mixture to effect a reaction (1). It is more preferable to wash the solid product obtained by the reaction (1) with the aromatic hydrocarbon compound (iv), cause the solid product to come in contact with a mixture of the components (ii) and (iv), and heat the mixture to effect a reaction (2).

The solid component (a) is particularly preferably produced by suspending the dialkoxymagnesium (i) in the hydrocarbon solvent (iv) having a boiling point of 50 to 150° C., causing a mixture of the tetravalent titaniumhalidecompound (ii) and the hydrocarbon solvent (iv) having a boiling point of 50 to 150° C. to come in contact with the suspension, and reacting the mixture. In this case, before or after causing the mixture of the tetravalent titaniumhalidecompound (ii) and the hydrocarbon solvent (iv) having a boiling point of 50 to 150° C. to come in contact with the suspension, at least one electron donor compound (iii) (e.g., phthalic acid diester) is caused to come in contact with the suspension at −20 to 130° C., and optionally caused to come in contact with the component (v) to effect the primary reaction to obtain a solid product (1). It is desirable to effect an aging reaction at a low temperature before or after causing the electron donor compound to come in contact with the suspension. The solid product (1) is washed with a hydrocarbon compound that is liquid at room temperature (preferably the hydrocarbon solvent (iv) having a boiling point of 50 to 150° C.) (intermediate washing step), and caused to come in contact with the tetravalent titanium halide compound (ii) at −20 to 150° C. in the presence of the hydrocarbon solvent to effect the secondary reaction to obtain a solid product (2). Note that the intermediate washing step and the secondary reaction may be repeated a plurality of times. The solid product (2) is then washed with a hydrocarbon compound that is liquid at room temperature by decantation to obtain the solid component (a).

The ratio of the components when producing the solid component (a) is determined depending on the production method. For example, the tetravalent titanium halide compound (ii) is used in an amount of 0.5 to 100 mol, preferably 0.5 to 50 mol, and still more preferably 1 to 10 mol, based on 1 mol of the magnesium compound (i). The electron donor compound (iii) is used in an amount of 0.01 to 10 mol, preferably 0.01 to 1 mol, and still more preferably 0.02 to 0.6 mol, based on 1 mol of the magnesium compound (i). The hydrocarbon solvent (iv) is used in an amount of 0.001 to 500 mol, preferably 0.001 to 100 mol, and still more preferably 0.005 to 10 mol, based on 1 mol of the magnesium compound (i). The polysiloxane (v) is used in an amount of 0.01 to 100 g, preferably 0.05 to 80 g, and still more preferably 1 to 50 g, based on 1 mol of the magnesium compound (i).

The content of titanium, magnesium, a halogen, and the electron donor compound in the solid component (a) is not particularly limited. The titanium content is preferably 1.0 to 8.0 wt %, more preferably 2.0 to 8.0 wt %, and still more preferably 3.0 to 8.0 wt %. The magnesium content is preferably 10 to 70 wt %, more preferably 10 to 50 wt %, still more preferably 15 to 40 wt %, and particularly preferably 15 to 25 wt %. The halogen content is preferably 20 to 90 wt %, more preferably 30 to 85 wt %, still more preferably 40 to 80 wt %, and particularly preferably 45 to 75 wt %. The content of the electron donor compound is preferably 0.5 to 30 wt %, more preferably 1 to 25 wt %, and particularly preferably 2 to 20 wt %.

Aminosilane Compound (b)

The aminosilane compound (b) (hereinafter may be referred to as "component (b)") used for the solid catalyst component for olefin polymerization according to one embodiment of the invention is not particularly limited insofar as the aminosilane compound (b) is shown by the general formula (1). The aminosilane compound (b) shown by the general formula (1) includes active hydrogen. An active hydrogen-containing aminosilane compound has been used as an external electron donor compound employed during polymerization. However, since it has been considered that an active hydrogen-containing aminosilane compound adversely affects titanium (active site) as a catalyst poison when used as a component of a solid catalyst component for olefin polymerization, an active hydrogen-containing aminosilane compound has not been used as an internal electron donor compound of a solid catalyst component.

Examples of the component (b) include (alkylamino)trialkylsilane, (alkylamino)dialkylcycloalkylsilane, (alkylamino)alkyldicycloalkylsilane, (alkylamino)tricycloalkylsilane, (alkylamino)(dialkylamino)dialkylsilane, (alkylamino)(dialkylamino)dicycloalkylsilane, bis(alkylamino)dialkylsilane, bis(alkylamino)alkylcycloalkylsilane, bis(alkylamino)dicycloalkylsilane, bis(alkylamino)(dialkylamino)alkylsilane, bis(alkylamino)(dialkylamino)cycloalkylsilane, di(alkylamino)dialkylsilane, di(alkylamino)alkylcycloalkylsilane, di(alkylamino)dicycloalkylsilane, di(cycloalkylamino)dialkylsilane, di(cycloalkylamino)alkylcycloalkylsilane, di(cycloalkylamino)dicycloalkylsilane, tris(alkylamino)alkylsilane, tris(alkylamino)cycloalkylsilane, tri(alkylamino)alkylsilane, tris(alkylamino)(dialkylamino)silane, tri(alkylamino)cycloalkylsilane, tri(cycloalkylamino)alkylsilane, tri(cycloalkylamino)cycloalkylsilane, tetrakis(alkylamino)silane, tris(alkylamino)dialkylaminosilane, tris(cycloalkylamino)dialkylaminosilane, bis(dialkylamino)bis(alkylamino)silane, dialkylaminotris(alkylamino)silane, bis(perhydroisoquinolino)bis(alkylamino)silane, bis(perhydroisoquinolino)bis(alkylamino)silane, bis(cycloalkylamino)bis(alkylamino)silane, tetra(alkylamino)silane, tri(alkylamino)dialkylaminosilane, tri(cycloalkylamino)dialkylaminosilane, di(dialkylamino)di(alkylamino)silane, dialkylaminotri(alkylamino)silane, di(alkyl-substituted perhydroisoquinolino)di(alkylamino)silane, di(alkyl-substituted perhydroquinolino)di(alkylamino)silane, and di(cycloalkylamino)di(alkylamino)silane.

Among these, bis(alkylamino)dicyclopentylsilane, bis(alkylamino)diisopropylsilane, bis(alkylamino)di-t-butylsilane, bis(alkylamino)t-butylethylsilane, bis(alkylamino)t-butylmethylsilane, bis(alkylamino)dicyclohexylsilane, bis(alkylamino)cyclohexylmethylsilane, bis(alkylamino)bis(decahydronaphthyl)silane, bis(alkylamino)cyclopentylcyclohexylsilane, bis(perhydroisoquinolino)(alkylamino)alkylsilane, bis(perhydroquinolino)(alkylamino)alkylsilane, di(alkylamino)dicyclopentylsilane, di(alkylamino)diisopropylsilane, di(alkylamino)di-t-butylsilane, di(alkylamino)t-butylethylsilane, di(alkylamino)t-butylmethylsilane, di(alkylamino)dicyclohexylsilane, di(alkylamino)cyclohexylmethylsilane, di(alkylamino)di(decahydronaphthyl)silane, di(alkylamino)cyclopentylcyclohexylsilane, di(alkylamino)cyclohexylthexylsilane, tetrakis(methylamino)silane, tris(alkylamino)alkylsilane, tris(alkylamino)cycloalkylsilane, bis(dialkylamino)bis(alkylamino)silane, dialkylaminotris(alkylamino)silane, and bis(perhydroisoquinolino)bis(alkylamino)silane are preferable, and bis(alkylamino)dicyclopentylsilane, bis(alkylamino)diisopropylsilane, bis(alkylamino)di-t-butylsilane, bis(alkylamino)t-butylethylsilane, bis(alkylamino)t-butylmethylsilane, bis(alkylamino)dicyclohexylsilane, bis(alkylamino)cyclohexylmethylsilane, bis(alkylamino)bis(decahydronaphthyl)silane, bis(alkylamino)cyclopentylcyclohexylsilane, bis(perhydroisoquinolino)(alkylamino)alkylsilane, and bis(perhydroquinolino)(alkylamino)alkylsilane are more preferable.

Specific examples of the aminosilane compound include tris(methylamino)methylsilane, tris(methylamino)ethylsilane, tris(methylamino)n-propylsilane, tris(methylamino)isopropylsilane, tris(methylamino)n-butylsilane, tris(methylamino)isobutylsilane, tris(methylamino)t-butylsilane, tris(methylamino)cyclopentylsilane, tris(methylamino)cyclohexylsilane, tris(methylamino)vinylsilane, tris(ethylamino)methylsilane, tris(ethylamino)ethylsilane, tris(ethylamino)n-propylsilane, tris(ethylamino)isopropylsilane, tris(ethylamino)n-butylsilane, tris(ethylamino)isobutylsilane, tris(ethylamino)cyclopentylsilane, tris(ethylamino)cyclohexylsilane, tris(ethylamino)vinylsilane, tris(ethylamino)phenylsilane, tris(n-propylamino)methylsilane, tris(n-propylamino)ethylsilane, tris(n-propylamino)n-propylsilane, tris(n-propylamino)isopropylsilane, tris(n-propylamino)n-butylsilane, tris(n-propylamino)isobutylsilane, tris(n-propylamino)cyclopentylsilane, tris(n-propylamino)cyclohexylsilane, tris(n-propylamino)vinylsilane, tris(isopropylamino)methylsilane, tris(isopropylamino)ethylsilane, tris(isopropylamino)n-propylsilane, tris(isopropylamino)isopropylsilane, tris(isopropylamino)n-butylsilane, tris(isopropylamino)isobutylsilane, tris(isopropylamino)cyclopentylsilane, tris(isopropylamino)cyclohexylsilane, tris(isopropylamino)vinylsilane, tris(n-butylamino)isopropylsilane, tris(sec-butylamino)ethylsilane, tris(t-butylamino)methylsilane, tris(cyclopentylamino)ethylsilane, tris(cyclopentylamino)isopropylsilane, tris(cyclohexylamino)ethylsilane, tris(cyclohexylamino)isopropylsilane, tris(cyclohexylamino)benzylsilane, tris(cyclohexylamino)phenylsilane, tris(cyclohexylamino)vinylsilane, tris(methylamino)methylaminosilane, tris(methylamino)ethylaminosilane, tris(methylamino)n-propylaminosilane, tris(methylamino)isopropylaminosilane, tris(methylamino)n-butylaminosilane, tris(methylamino)isobutylaminosilane, tris(methylamino)t-butylaminosilane, tris(methylamino)cyclopentylaminosilane, tris(methylamino)cyclohexylaminosilane, tris(methylamino)vinylaminosilane, tris(ethylamino)methylaminosilane, tris(ethylamino)ethylaminosilane, tris(ethylamino)n-propylaminosilane, tris(ethylamino)isopropylaminosilane, tris(ethylamino)n-butylaminosilane, tris(ethylamino)isobutylaminosilane, tris(ethylamino)cyclopentylaminosilane, tris(ethylamino)cyclohexylaminosilane, tris(ethylamino)vinylaminosilane, tris(ethylamino)phenylaminosilane, tris(n-propylamino)methylaminosilane, tris(n-propylamino)ethylaminosilane, tris(n-propylamino)n-propylaminosilane, tris(n-propylamino)isopropylaminosilane, tris(n-propylamino)n-butylaminosilane, tris(n-propylamino)isobutylaminosilane, tris(n-propylamino)cyclopentylaminosilane, tris(n-propylamino)cyclohexylaminosilane, tris(n-propylamino)vinylaminosilane, tris(isopropylamino)methylaminosilane, tris(isopropylamino)ethylaminosilane, tris(isopropylamino)n-propylaminosilane, tris(isopropylamino)isopropylaminosilane, tris(isopropylamino)n-butylaminosilane, tris(isopropylamino)isobutylaminosilane, tris(isopropylamino)t-butylaminosilane, tris(isopropylamino)cyclopentylaminosilane, tris(isopropylamino)cyclohexylaminosilane, tris(isopropylamino)vinylaminosilane, tris(n-butylamino)methyl, tris(n-butylamino)ethylaminosilane, tris(n-butylamino)n-propylaminosilane, tris(n-butylamino)isopropylaminosilane, tris(sec-butylamino)methylaminosilane, tris(sec-butylamino)ethylaminosilane, tris(sec-butylamino)n-propylaminosilane, tris(sec-butylamino)isopropylaminosilane, tris(sec-butylamino)n-butylaminosilane, tris(sec-butylamino)isobutylaminosilane, tris(sec-butylamino)t-butylaminosilane, tris(t-butylamino)methylaminosilane, tris(t-butylamino)ethylaminosilane, tris(t-butylamino)n-propylaminosilane, tris(t-butylamino)isopropylaminosilane, tris(t-butylamino)n-butylaminosilane, tris(t-butylamino)isopropylaminosilane, tris(t-butylamino)t-butylaminosilane, tris(cyclopentylamino)methylaminosilane, tris(cyclopentylamino)ethylaminosilane, tris(cyclopentylamino)isopropylaminosilane, tris(cyclopentylamino)n-butylaminosilane, tris(cyclopentylamino)isobutylaminosilane, tris(cyclopentylamino)t-butylaminosilane, tris(cyclohexylamino)methylaminosilane, tris(cyclohexylamino)ethylaminosilane, tris(cyclohexylamino)n-propylaminosilane, tris(cyclohexylamino)

isopropylaminosilane, tris(cyclohexylamino)n-butylaminosilane, tris(cyclohexylamino)isobutylaminosilane, tris(cyclohexylamino)t-butylaminosilane, tris(cyclohexylamino)benzylaminosilane, tris(cyclohexylamino)phenylaminosilane, tris(cyclohexylamino)vinylaminosilane, bis(methylamino)(dimethylamino)methylsilane, bis(methylamino)(diethylamino)methylsilane, bis(methylamino)(methylethylamino)methylsilane, bis(methylamino)(di-n-propylamino)methylsilane, bis(methylamino)(methyl-n-propylamino)methylsilane, bis(methylamino)(methylisopropylamino)methylsilane, bis(methylamino)(methyl-n-butylamino)methylsilane, bis(methylamino)(ethyl-n-butylamino)methylsilane, bis(methylamino)(ethylisobutylamino)methylsilane, bis(methylamino)(ethyl-sec-butylamino)methylsilane, bis(methylamino)(ethyl-t-butylamino)methylsilane, bis(methylamino)(methylcyclopentylamino)methylsilane, bis(methylamino)(ethylcyclopentylamino)methylsilane, bis(methylamino)(methylcyclohexylamino)methylsilane, bis(methylamino)(ethylcyclohexylamino)methylsilane, bis(methylamino)(dimethylamino)ethylsilane, bis(methylamino)(diethylamino)ethylsilane, bis(methylamino)(methylethylamino)ethylsilane, bis(methylamino)(di-n-propylamino)ethylsilane, bis(methylamino)(methyl-n-propylamino)ethylsilane, bis(methylamino)(methylisopropylamino)ethylsilane, bis(methylamino)(methyl-n-butylamino)ethylsilane, bis(methylamino)(ethyl-n-butylamino)ethylsilane, bis(methylamino)(ethylisobutylamino)ethylsilane, bis(methylamino)(ethyl-sec-butylamino)ethylsilane, bis(methylamino)(ethyl-t-butylamino)ethylsilane, bis(methylamino)(methylcyclopentylamino)ethylsilane, bis(methylamino)(ethylcyclopentylamino)ethylsilane, bis(methylamino)(methylcyclohexylamino)ethylsilane, bis(methylamino)(ethylcyclohexylamino)ethylsilane, bis(methylamino)(isobutylamino)methylsilane, bis(methylamino)(isobutylamino)ethylsilane, bis(methylamino)(isobutylamino)n-propylsilane, bis(methylamino)(isobutylamino)isopropylsilane, bis(methylamino)(isobutylamino)n-butylsilane, bis(methylamino)(isobutylamino)sec-butylsilane, bis(methylamino)(isobutylamino)isobutylsilane, bis(methylamino)(isobutylamino)t-butylsilane, bis(methylamino)(isobutylamino)thexylsilane, bis(methylamino)(isobutylamino)cyclopentylsilane, bis(methylamino)(isobutylamino)cyclohexylsilane, bis(methylamino)(isobutylamino)perhydronaphthylsilane, bis(methylamino)(isobutylamino)adamantylsilane, bis(methylamino)(t-butylamino)methylsilane, bis(methylamino)(t-butylamino)ethylsilane, bis(methylamino)(t-butylamino)n-propylsilane, bis(methylamino)(t-butylamino)isopropylsilane, bis(methylamino)(t-butylamino)n-butylsilane, bis(methylamino)(t-butylamino)sec-butylsilane, bis(methylamino)(t-butylamino)isobutylsilane, bis(methylamino)(t-butylamino)t-butylsilane, bis(methylamino)(t-butylamino)thexylsilane, bis(methylamino)(t-butylamino)cyclopentylsilane, bis(methylamino)(t-butylamino)cyclohexylsilane, bis(methylamino)(t-butylamino)perhydronaphthylsilane, bis(methylamino)(t-butylamino)adamantylsilane, bis(methylamino)dimethylsilane, bis(methylamino)diethylsilane, bis(methylamino)divinylsilane, bis(methylamino)di-n-propylsilane, bis(methylamino)diisopropylsilane, bis(methylamino)di-n-butylsilane, bis(methylamino)diisobutylsilane, bis(methylamino)di-sec-butylsilane, bis(methylamino)di-t-butylsilane, bis(methylamino)dineopentylsilane, bis(methylamino)dicyclopentylsilane, bis(methylamino)dicyclohexylsilane, bis(methylamino)di-4-methoxyphenylsilane, bis(methylamino)methylethylsilane, bis(methylamino)methyl-t-butylsilane, bis(methylamino)methylphenylsilane, bis(methylamino)ethyl-t-butylsilane, bis(methylamino)sec-butylmethylsilane, bis(methylamino)sec-butylethylsilane, bis(methylamino)methylcyclopentylsilane, bis(methylamino)ethylcyclopentylsilane, bis(methylamino)cyclopentylcyclohexylsilane, bis(methylamino)methylcyclohexylsilane, bis(methylamino)didecahydronaphthylsilane, bis(methylamino)thexylmethylsilane, bis(ethylamino)dimethylsilane, bis(ethylamino)diethylsilane, bis(ethylamino)divinylsilane, bis(ethylamino)di-n-propylsilane, bis(ethylamino)diisopropylsilane, bis(ethylamino)di-n-butylsilane, bis(ethylamino)diisobutylsilane, bis(ethylamino)di-sec-butylsilane, bis(ethylamino)di-t-butylsilane, bis(ethylamino)dicyclopentylsilane, bis(ethylamino)dicyclohexylsilane, bis(ethylamino)didecahydronaphthylsilane, bis(ethylamino)methylethylsilane, bis(ethylamino)methyl-t-butylsilane, bis(ethylamino)methylphenylsilane, bis(ethylamino)ethyl-t-butylsilane, bis(ethylamino)sec-butylmethylsilane, bis(ethylamino)sec-butylethylsilane, bis(ethylamino)methylcyclopentylsilane, bis(ethylamino)cyclopentylcyclohexylsilane, bis(ethylamino)methylcyclohexylsilane, bis(ethylamino)t-butylisobutylsilane, bis(ethylamino)cyclohexylthexylsilane, bis(n-propylamino)dimethylsilane, bis(n-propylamino)diethylsilane, bis(n-propylamino)divinylsilane, bis(n-propylamino)di-n-propylsilane, bis(n-propylamino)diisopropylsilane, bis(n-propylamino)di-n-butylsilane, bis(n-propylamino)diisobutylsilane, bis(n-propylamino)di-sec-butylsilane, bis(n-propylamino)di-t-butylsilane, bis(n-propylamino)dineopentylsilane, bis(n-propylamino)dicyclopentylsilane, bis(n-propylamino)dicyclohexylsilane, bis(isopropylamino)dimethylsilane, bis(isopropylamino)diethylsilane, bis(isopropylamino)divinylsilane, bis(isopropylamino)di-n-propylsilane, bis(isopropylamino)diisopropylsilane, bis(isopropylamino)di-n-butylsilane, bis(isopropylamino)diisobutylsilane, bis(isopropylamino)di-sec-butylsilane, bis(isopropylamino)di-t-butylsilane, bis(isopropylamino)dineopentylsilane, bis(isopropylamino)dicyclopentylsilane, bis(isopropylamino)dicyclohexylsilane, bis(isopropylamino)didecahydronaphthylsilane, bis(isopropylamino)ditetrahydronaphthylsilane, bis(isopropylamino)dibenzylsilane, bis(isopropylamino)diphenylsilane, bis(isopropylamino)methylethylsilane, bis(isopropylamino)methyl-t-butylsilane, bis(isopropylamino)ethyl-t-butylsilane, bis(isopropylamino)sec-butylmethylsilane, bis(isopropylamino)sec-butylethylsilane, bis(isopropylamino)methylneopentylsilane, bis(isopropylamino)methylcyclopentylsilane, bis(isopropylamino)isopropylcyclopentylsilane, bis(isopropylamino)isobutylcyclopentylsilane, bis(isopropylamino)cyclopentylcyclohexylsilane, bis(isopropylamino)methylcyclohexylsilane, bis(methylamino)(dimethylamino)ethylaminosilane, bis(methylamino)(diethylamino)ethylaminosilane, bis(methylamino)(methylethylamino)ethylaminosilane, bis(methylamino)(di-n-propylamino)ethylaminosilane, bis(methylamino)(methyl-n-propylamino)ethylaminosilane, bis(methylamino)(methylisopropylamino)ethylaminosilane, bis(methylamino)(methyl-n-butylamino)ethylaminosilane, bis(methylamino)(ethyl-n-butylamino)ethylaminosilane, bis(methylamino)(ethylisobutylamino)ethylaminosilane, bis(methylamino)(ethyl-sec-butylamino)ethylaminosilane, bis(methylamino)(ethyl-t-butylamino)ethylaminosilane, bis(methylamino)(methylcyclopentylamino)ethylaminosilane, bis(methylamino)(ethylcyclopentylamino)ethylaminosilane, bis(methylamino)(methylcyclohexylamino)ethylaminosilane, bis(methylamino)(ethylcyclohexylamino)ethylaminosilane, bis(methylamino)(isobutylamino)n-propylaminosilane, bis(methylamino)(isobutylamino)n-butylaminosilane, bis(methylamino)(isobutylamino)sec-butylaminosilane, bis(methylamino)(isobutylamino)t-butylaminosilane, bis(methylamino)(isobutylamino)thexylaminosilane, bis(methylamino)(isobutylamino)cyclopentylaminosilane, bis(methylamino)(isobutylamino)cyclohexylaminosilane, bis(methylamino)(t-butylamino)n-propylaminosilane, bis(methylamino)(t-butylamino)isopropylaminosilane, bis(methylamino)(t-butylamino)n-butylaminosilane, bis(methylamino)(t-butylamino)sec-butylaminosilane, bis(methylamino)(t-butylamino)isobutylaminosilane, bis(methylamino)(t-butylamino)thexylaminosilane, bis(methylamino)(t-butylamino)cyclopentylaminosilane, bis(methylamino)(t-butylamino)cyclohexylaminosilane, bis(methylamino)methylethylaminosilane, bis(methylamino)methyl-t-butylaminosilane, bis(methylamino)methylphenylaminosilane, bis(methylamino)ethyl-t-butylaminosilane, bis(methylamino)sec-butylaminomethylsilane, bis(methylamino)sec-butylaminoethylsilane, bis(methylamino)methylcyclopentylaminosilane, bis(methylamino)ethylcyclopentylaminosilane, bis(methylamino)cyclopentylaminocyclohexylsilane, bis(methylamino)methylcyclohexylaminosilane, bis(methylamino)thexylaminomethylsilane, bis(ethylamino)methyl-t-butylaminosilane, bis(ethylamino)methylphenylaminosilane, bis(ethylamino)ethyl-t-butylaminosilane, bis(ethylamino)sec-butylaminomethylsilane, bis(ethylamino)sec-butylaminoethylsilane, bis(ethylamino)methylcyclopentylaminosilane, bis(ethylamino)cyclopentylaminocyclopentylsilane, bis(ethylamino)cyclopentylaminocyclohexylsilane, bis(ethylamino)cyclohexylaminocyclopentylsilane, bis(ethylamino)methylcyclohexylaminosilane, bis(ethylamino)t-butylaminoisobutylsilane, bis(ethylamino)cyclohexylaminothexylsilane, bis(ethylamino)thexylaminocyclohexylsilane, bis(isopropylamino)methylethylaminosilane, bis(isopropylamino)methyl-t-butylaminosilane, bis(isopropylamino)ethyl-t-butylaminosilane, bis(isopropylamino)sec-butylaminomethylsilane, bis(isopropylamino)sec-butylaminoethylsilane, bis(isopropylamino)methylneopentylaminosilane, bis(isopropylamino)methylcyclopentylaminosilane, bis(isopropylamino)isopropylcyclopentylaminosilane, bis(isopropylamino)isopropylaminocyclopentylsilane, bis(isopropylamino)isobutylaminocyclopentylsilane, bis(isopropylamino)isobutylcyclopentylaminosilane, bis(isopropylamino)cyclopentylaminocyclohexylsilane, bis(isopropylamino)cyclopentylcyclohexylaminosilane, bis(isopropylamino)methylcyclohexylaminosilane, tetrakis(methylamino)silane, tetrakis(ethylamino)silane, tetrakis(n-propylamino)silane, tetrakis(isopropylamino)silane, tetrakis(n-butylamino)silane, tetrakis(isobutylamino)silane, tetrakis(sec-butylamino)silane, tetrakis(n-hexylamino)silane, tris(methylamino)(ethylamino)silane, tris(methylamino)(n-propylamino)silane, tris(methylamino)(isopropylamino)silane, tris(methylamino)(n-butylamino)silane, tris(methylamino)(sec-butylamino)silane, tris(methylamino)(t-butylamino)silane, tris(methylamino)(neo-pentylamino)silane, tris(methylamino)(di-4-methoxyphenylamino)silane, tris(methylamino)(diethylamino)silane, tris(methylamino)(diisopropylamino)silane, tris(methylamino)(diisobutylamino)silane, tris(methylamino)(di-sec-butylamino)silane, tris(methylamino)(di-t-butylamino)silane, tris(methylamino)(perhydroisoquinolino)silane, tris(methylamino)(perhydroquinolino)silane, tris(methylamino)(dicyclopentylamino)silane, tris(methylamino)(dicyclohexylamino)silane, tris(methylamino)(t-butylethylamino)silane, tris(methylamino)(t-butyl-n-propylamino)silane, tris(methylamino)(sec-butylethylamino)silane, tris(methylamino)(sec-butylisopropylamino)silane, tris(ethylamino)(methylamino)silane, tris(ethylamino)(n-propylamino)silane, tris(ethylamino)(isopropylamino)silane, tris(ethylamino)(n-butylamino)silane, tris(ethylamino)(sec-butylamino)silane, tris(ethylamino)(t-butylamino)silane, tris(ethylamino)(neopentylamino)silane, tris(ethylamino)(diethylamino)silane, tris(ethylamino)(diisopropylamino)silane, tris(ethylamino)(diisobutylamino)silane, tris(ethylamino)(di-sec-butylamino)silane, tris(ethylamino)(di-t-butylamino)silane, tris(ethylamino)(dicyclopentylamino)silane, tris(ethylamino)(dicyclohexylamino)silane, tris(ethylamino)(perhydroisoquinolino)silane, tris(ethylamino)(perhydroquinolino)silane, tris(ethylamino)(t-butylethylamino)silane, tris(n-propylamino)(methylamino)silane, tris(n-propyl)(isopropylamino)silane, tris(n-propylamino)(t-butylamino)silane, tris(n-propylamino)(n-butylamino)silane, tris(n-propylamino)(sec-butylamino)silane, tris(n-propylamino)(cyclopentylamino)silane, tris(n-propylamino)(cyclohexylamino)silane, tris(n-propylamino)(diethylamino)silane, tris(n-propylamino)(diisopropylamino)silane, tris(n-propylamino)(diisobutylamino)silane, tris(n-propylamino)(di-t-butylamino)silane, tris(n-propylamino)(dicyclopentylamino)silane, tris(n-propylamino)(dicyclohexylamino)silane, tris(n-propylamino)(perhydroisoquinolino)silane, tris(isopropylamino)(perhydroquinolino)silane, bis(methylamino)bis(ethylamino)silane, bis(methylamino)bis(n-propylamino)silane, bis(methylamino)bis(isopropylamino)silane, bis(methylamino)bis(n-butylamino)silane, bis(methylamino)bis(isobutylamino)silane, bis(methylamino)bis(sec-butylamino)silane, bis(methylamino)bis(t-butylamino)silane, bis(methylamino)bis(cyclopentylamino)silane, bis(methylamino)bis(cyclohexylamino)silane, bis(methylamino)bis(perhydroisoquinolino)silane, bis(methylamino)bis(tetrahydroisoquinolino)silane, bis(methylamino)bis(perhydroquinolino)silane, bis(methylamino)bis(diethylamino)silane, bis(methylamino)bis(di-n-propylamino)silane, bis(methylamino)bis(diisopropylamino)silane, bis(methylamino)bis(di-n-butylamino)silane, bis(methylamino)bis(diisobutylamino)silane, bis(methylamino)bis(di-sec-butylamino)silane, bis(methylamino)bis(di-t-butylamino)silane, bis(methylamino)bis(dicyclopentylamino)silane, bis(methylamino)bis(dicyclohexylamino)silane, bis(ethylamino)bis(n-propylamino)silane, bis(ethylamino)bis(isopropylamino)silane, bis(ethylamino)bis(n-butylamino)silane, bis(ethylamino)bis(isobutylamino)silane, bis(ethylamino)bis(sec-butylamino)silane, bis(ethylamino)bis(t-butylamino)silane, bis(ethylamino)bis(cyclopentylamino)silane, bis(ethylamino)bis(cyclohexylamino)silane, bis(ethylamino)bis(perhydroisoquinolino)silane, bis(ethylamino)bis(perhydroquinolino)silane, bis(ethylamino)bis(cyclooctamethyleneimino)silane, bis(ethylamino)bis(diethylamino)silane, bis(ethylamino)bis(di-n-propylamino)silane, bis(ethylamino)bis(diisopropylamino)silane, bis(ethylamino)bis(di-n-butylamino)silane, bis(ethylamino)bis(diisobutylamino)silane, bis(ethylamino)bis(di-secbutylamino)silane, bis(ethylamino)bis(di-t-butylamino)silane, bis(ethylamino)bis(dicyclopentylamino)silane, bis(ethylamino)bis(dicyclohexylamino)silane, bis(n-propylamino)bis(cyclopentylamino)silane, bis(n-propylamino)bis(cyclohexylamino)silane, bis(n-propylamino)bis(perhydroisoquinolino)silane, bis(n-propylamino)bis(perhydroquinolino)silane, bis(n-propylamino)bis(diethylamino)silane, bis(propylamino)bis(di-n-propylamino)silane, bis(n-propylamino)bis(diisopropylamino)silane, bis(n-propylamino)bis(di-n-butylamino)silane, bis(n-propylamino)bis(diisobutylamino)silane, bis(n-propylamino)bis(di-sec-butylamino)silane, bis(n-propylamino)bis(di-t-butylamino)silane, bis(n-propylamino)bis(dicyclopentylamino)silane, bis(n-propylamino)bis(dicyclohexylamino)silane, tris(dimethylamino)(methylamino)silane, tris(diethylamino)(methylamino)silane, tris(di-n-propylamino)(methylamino)silane, tris(diisopropylamino)(methylamino)silane, tris(di-n-butylamino)(methylamino)silane, tris(diisobutylamino)(methylamino)silane, tris(t-butylamino)(methylamino)silane, tris(cyclopentylamino)(methylamino)silane, tris(cyclohexylamino)(methylamino)silane, tris(dimethylamino)(ethylamino)silane, tris(diethylamino)(ethylamino)silane, tris(di-n-propylamino)(ethylamino)silane, tris(diisopropylamino)(ethylamino)silane, tris(di-n-butylamino)(ethylamino)silane, tris(diisobutylamino)(ethylamino)silane, tris(t-butylamino)(ethylamino)silane, tris(cyclopentylamino)(ethylamino)silane, tris(cyclohexylamino)(ethylamino)silane, tris(dimethylamino)(n-propylamino)silane, tris(diethylamino)(n-propylamino)silane, tris(di-n-propylamino)(n-propylamino)silane, tris(diisopropylamino)(n-propylamino)silane, tris(di-n-butylamino)(n-propylamino)silane, tris(diisobutylamino)(n-propylamino)silane, tris(t-butylamino)(n-propylamino)silane, tris(cyclopentylamino)(n-propylamino)silane, tris(cyclohexylamino)(n-propylamino)silane, and the like. Among these, bis(ethylamino)di-t-butylsilane, bis(ethylamino)dicyclopentylsilane, bis(ethylamino)methyl-t-butylsilane, and bis(ethylamino)ethyl-t-butylsilane are preferably used. These organosilicon compounds (b) may be used either individually or in combination.

In the general formula (1), n is preferably an integer from 1 to 3, and $R^1$ preferably represents an alkyl group having 1 to 8 carbon atoms (particularly an alkyl group having 1 to 6 carbon atoms) or a cyclopentyl group having 5 to 8 carbon atoms. The $R^2R^3$ group other than an N—H bond preferably represents an alkyl group having 1 to 6 carbon atoms (particularly an alkyl group having 1 to 4 carbon atoms). It is preferable that $R^1$ in the general formula (1) (aminosilane compound (b)) be an alkyl group that includes a secondary carbon atom or a tertiary carbon atom. In this case, a high MFR is obtained. The term "unsubstituted group" used herein refers to a group that does not include a substituent. Examples of a substituent include an alkyl group, a vinyl group, an allyl group, an aralkyl group, and the like.

Organosilicon Compound (c)

The organosilicon compound (c) (hereinafter may be referred to as "component (c)") used for the solid catalyst component for olefin polymerization according to one embodiment of the invention is not particularly limited insofar as the organosilicon compound (c) is at least one compound selected from an organosilicon compound shown by the general formula (2-A) and an organosilicon compound shown by the general formula (2-B).

Examples of the organosilicon compound shown by the general formula (2-A) include vinyl group-containing alkylsilanes, vinyl group-containing cycloalkylsilanes, vinyl group-containing phenylsilanes, vinyl group-containing halogenated silanes, vinyl group-containing alkyl halogenated silanes, alkenyl group-containing alkylsilanes, alkenyl group-containing cycloalkylsilanes, alkenyl group-containing phenylsilanes, alkenyl group-containing vinylsilanes, alkenyl group-containing halogenated silanes, and alkenyl group-containing alkyl halogenated silanes. The alkenyl group refers to a group shown by $CH_2=CH-(CH_2)_l-$. $R^4$ in the general formula (2) preferably represents a methyl group, an ethyl group, a vinyl group, or a chlorine atom. Vinylsilane, divinylsilane, alkenylvinylsilane, alkenylsilane, dialkenylsilane, and trialkenylsilane are preferable as the organosilicon compound. Allylsilane wherein 1 is 1 and 3-butenylsilane wherein 1 is 2 are preferable as the organosilicon compound. The organosilicon compound is particularly preferably a vinyltrialkylsilane, divinyldialkylsilane, allylvinyldialkylsilane, allyltrialkylsilane, diallyldialkylsilane, diallyl dihalide, or triallylalkylsilane.

Specific examples of the organosilicon compound (c) shown by the general formula (2-A) include vinyltrimethylsilane, vinyltriethylsilane, vinylmethyldichlorosilane, vinyltrichlorosilane, vinyltribromosilane, divinyldimethylsilane, divinyldiethylsilane, divinylmethylchlorosilane, divinyldichlorosilane, divinyldibromosilane, trivinylmethylsilane, trivinylethylsilane, trivinylchlorosilane, trivinylbromosilane, tetravinylsilane, allyltriethylsilane, allyltrivinylsilane, allylmethyldivinylsilane, allyldimethylvinylsilane, allylmethyldichlorosilane, allyltrichlorosilane, allyltribromosilane, diallyldimethylsilane, diallyldiethylsilane, diallyldivinylsilane, diallylmethylvinylsilane, diallylmethylchlorosilane, diallyldichlorosilane, diallyldibromosilane, triallylmethylsilane, triallylethylsilane, triallylvinylsilane, triallylchlorosilane, triallylbromosilane, tetraallylsilane, di-3-butenyldimethylsilane, di-3-butenyldiethylsilane, di-3-butenyldivinylsilane, di-3-butenylmethylvinylsilane, di-3-butenylmethylchlorosilane, di-3-butenyldichlorosilane, di-3-butenyldibromosilane, tri-3-butenylmethylsilane, tri-3-butenylethylsilane, tri-3-butenylvinylsilane, tri-3-butenylchlorosilane, tri-3-butenylbromosilane, and tetra-3-butenylsilane. Among these, vinyltrimethylsilane, divinyldimethylsilane, allyldimethylvinylsilane, diallyldimethylsilane, triallylmethylsilane, trivinylmethylsilane, di-3-butenyldimethylsilane, diallyldichlorosilane, divinyldichlorosilane, vinylallyldimethylsilane, and allyltriethylsilane are preferable.

Examples of the organosilicon compound shown by the general formula (2-B) include alkylalkoxysilanes, alkyl(cycloalkyl)alkoxysilanes, cycloalkylalkoxysilanes, phenylalkoxysilanes, alkyl(phenyl)alkoxysilanes, alkyl(dialkylamino)alkoxysilanes, (dialkylamino)alkoxysilanes, cycloalkyl(dialkylamino)alkoxysilanes, alkyl(dicycloalkylamino)alkoxysilanes, polycyclic aminoalkoxysilanes, alkyl(polycyclic amino)alkoxysilanes, and the like.

$R^5$ in the general formula (2-B) is preferably a methyl group, an ethyl group, an isopropyl group, an isobutyl group, a t-butyl group, a cyclopentyl group, or a cyclohexyl group. It is particularly preferable that a carbon atom directly bonded to Si be a secondary carbon atom or a tertiary carbon atom. A dialkoxysilane wherein s is 2 is also preferable. $R^6$ preferably represents a methyl group, an ethyl group, an isopropyl group, an isobutyl group, or a t-butyl group.

Specific examples of the organosilicon compound (c) shown by the general formula (2-B) include di-n-propyldimethoxysilane, diisopropyldimethoxysilane, di-n-butyldimethoxysilane, di-n-butyldiethoxysilane, t-butyl(methyl)dimethoxysilane, t-butyl(ethyl)dimethoxysilane, dicyclohexyldimethoxysilane, cyclohexyl(methyl)dimethoxysilane, dicyclopentyldimethoxysilane, cyclopentyl(methyl)diethoxysilane, cyclopentyl(ethyl)dimethoxysilane, cyclopentyl(cyclohexyl)dimethoxysilane, 3-methylcyclohexyl(cyclopentyl)dimethoxysilane, 4-methylcyclohexyl(cyclopentyl)dimethoxysilane, 3,5-dimethylcyclohexyl(cyclopentyl)dimethoxysilane, bis(diethylamino) dimethoxysilane, bis(di-n-propylamino)dimethoxysilane, bis(di-n-butylamino)dimethoxysilane, bis(di-t-butylamino) dimethoxysilane, bis(dicyclopentylamino)dimethoxysilane, bis(dicyclohexylamino)dimethoxysilane, bis(di-2-methylcyclohexylamino)dimethoxysilane, bis(isoquinolino) dimethoxysilane, bis(quinolino)dimethoxysilane, bis(ethyl-n-propylamino)dimethoxysilane, bis(ethylisopropylamino) dimethoxysilane, bis(ethyl-n-butylamino)dimethoxysilane, bis(ethylisobutylamino)dimethoxysilane, bis(ethyl-t-butylamino)dimethoxysilane, bis(isobutyl-n-propylamino) dimethoxysilane, bis(ethylcyclopentylamino)dimethoxysilane, bis(ethylcyclohexylamino)dimethoxysilane, ethyl (diethylamino)dimethoxysilane, n-propyl (diisopropylamino)dimethoxysilane, isopropyl(di-t-butylamino)dimethoxysilane, cyclohexyl(diethylamino) dimethoxysilane, ethyl(di-t-butylamino)dimethoxysilane, ethyl(isoquinolino)dimethoxysilane, n-propyl(isoquinolino) dimethoxysilane, isopropyl(isoquinolino)dimethoxysilane, n-butyl(isoquinolino)dimethoxysilane, ethyl(quinolino) dimethoxysilane, n-propyl(quinolino)dimethoxysilane, isopropyl(quinolino)dimethoxysilane, n-butyl(quinolino) dimethoxysilane, bis(diethylamino)diethoxysilane, bis(di-n-propylamino)diethoxysilane, bis(di-n-butylamino) diethoxysilane, bis(di-t-butylamino)diethoxysilane, bis (dicyclopentylamino)diethoxysilane, bis (dicyclohexylamino)diethoxysilane, bis(di-2-methylcyclohexylamino)diethoxysilane, bis(diisoquinolino) diethoxysilane, bis(diquinolino)diethoxysilane, bis(ethyl-n-propylamino)diethoxysilane, bis(ethylisopropylamino) diethoxysilane, bis(ethyl-n-butylamino)diethoxysilane, bis (ethyl-isobutylamino)diethoxysilane, bis(ethyl-t-butylamino)diethoxysilane, bis(isobutyl-n-propylamino) diethoxysilane, bis(ethylcyclopentylamino)diethoxysilane, bis(ethylcyclohexylamino)diethoxysilane, n-propyl(diisopropylamino)diethoxysilane, ethyl(isoquinolino)diethoxysilane, n-propyl(isoquinolino)diethoxysilane, isopropyl(isoquinolino)diethoxysilane, n-butyl(isoquinolino) diethoxysilane, ethyl(quinolino)diethoxysilane, n-propyl (quinolino)diethoxysilane, isopropyl(quinolino) diethoxysilane, n-butyl(quinolino)diethoxysilane, hexyltrimethoxysilane, diethylaminotrimethoxysilane, di-n-propylaminotrimethoxysilane, di-n-butylaminotrimethoxysilane, di-t-butylaminotrimethoxysilane, dicyclopentylaminotrimethoxysilane, dicyclohexylaminotrimethoxysilane, di-2-methylcyclohexylaminotrimethoxysilane, isoquinolinotrimethoxysilane, quinolinotrimethoxysilane, diethylaminotriethoxysilane, di-n-propylaminotriethoxysilane, di-n-butylaminotriethoxysilane, ethyl-t-butylaminotriethoxysilane, ethyl-sec-butylaminotriethoxysilane, dicyclopentylaminotriethoxysilane, dicyclohexylaminotriethoxysilane, di-2-methylcyclohexylaminotriethoxysilane, isoquinolinotriethoxysilane, and quinolinotriethoxysilane. Among these, t-butyl (methyl)dimethoxysilane, t-butyl(ethyl)dimethoxysilane, dicyclohexyldimethoxysilane, cyclohexyl(methyl) dimethoxysilane, and dicyclopentyldimethoxysilane are preferable. These organosilicon compounds (c) may be used either individually or in combination.

A compound shown by the following general formula may be used as the organoaluminum compound (d) that is optionally used to produce the solid catalyst component for olefin polymerization according to one embodiment of the invention.

$$R^7_r AlQ_{3-r} \tag{3}$$

wherein $R^7$ represents an alkyl group having 1 to 4 carbon atoms, Q represents a hydrogen atom or a halogen atom, and r is an integer from 1 to 3.

$R^7$ preferably represents an ethyl group or an isobutyl group, Q preferably represents a hydrogen atom, a chlorine atom, or a bromine atom, and r is preferably 2 or 3 (particularly preferably 3). Specific examples of the organoaluminum compound (d) include triethylaluminum, diethylaluminum chloride, triisobutylaluminum, diethylaluminum bromide, and diethylaluminum hydride. These compounds may be used either individually or in combination. Among these, triethylaluminum and triisobutylaluminum are preferable.

(Production of Solid Catalyst Component (A))

The solid catalyst component (A) is produced by causing the solid component (a), the component (b), and the component (c), or the solid component (a), the component (b), the component (c), and the component (d) to come in contact with each other. The components (a), (b), (c), and (d) are caused to come in contact with each other in the presence of an inert solvent taking account of ease of operation. Examples of the inert solvent include aliphatic hydrocarbon compounds such as hexane, heptane, cyclohexane, octane, and decane, aromatic hydrocarbon compounds such as benzene, toluene, xylene, and ethylbenzene, and the like. The components may be caused to come in contact in an arbitrary order, but are preferably caused to come in contact in the following order.

$$(a)+(b)+(c)+(d) \tag{1}$$

$$(a)+(b)+(c) \rightarrow (d) \tag{2}$$

$$(a)+(b) \rightarrow (c)+(d) \tag{3}$$

$$(a)+(c) \rightarrow (b)+(d) \tag{4}$$

$$(a)+(d) \rightarrow (b)+(c) \tag{5}$$

$$(a) \rightarrow (b)+(c) \text{ (premixed)} \rightarrow (d) \tag{6}$$

$$(a) \rightarrow (c)+(d) \text{ (premixed)} \rightarrow (b) \tag{7}$$

It is preferable to cause the component (a) to come in contact with the component (b) or the component (c), and then cause the component (d) to come in contact with the resulting mixture. When causing the component (a) to come in contact with the component (c), and then causing the component (b) and the component (d) to come in contact with the resulting mixture, the contact operation is performed in the presence of the component (b) or the component (c). After causing the components to come in contact with each other, the mixture is washed with an inert solvent (e.g., heptane) in order to remove unnecessary components. In particular, the catalytic activity may deteriorate with time if the component (d) remains in the solid catalyst component. Therefore, the component (d) is removed by sufficient washing. After causing the components (b), (c), and (d) to come in contact with the component (a), the mixture may be caused to come in contact with the components (b), (c), and (d) one or more times.

The components may be caused to come in contact with each other in an arbitrary ratio insofar as the effects of the invention are not affected. The component (b) or (c) is normally used in an amount of 0.2 to 10 mol, and preferably 0.5 to 5 mol, per mol of titanium in the component (a). If the component (b) or (c) is used within the above range, high activity and high stereoregularity can be achieved. The component (d) is used in an amount of 0.5 to 15 mol, preferably 1 to 10 mol, and particularly preferably 1.5 to 7 mol, per mol of titanium in the component (a). If the component (d) is used within the above range, high activity can be achieved.

The components may be caused to come in contact with each other at −10 to 100° C., preferably 0 to 90° C., and particularly preferably 20 to 80° C. The contact time is 1 minute to 10 hours, preferably 10 minutes to 5 hours, and particularly preferably 30 minutes to 2 hours. The component (c) may be polymerized to produce a polymer depending on the contact conditions for the component (c). If the contact temperature is 30° C. or more, the component (c) is partially or entirely polymerized to produce a polymer, so that the crystallinity of the resulting olefin polymer and the catalytic activity are improved.

The solid catalyst component (A) thus obtained includes magnesium, titanium, a halogen, the component (b), and the component (c) or a polymer thereof, the content of magnesium being 10 to 70 wt %, and preferably 10 to 50 wt %, the content of titanium being 1.0 to 8.0 wt %, and preferably 2.0 to 8.0 wt %, the content of the halogen being 20 to 90 wt %, and preferably 30 to 85 wt %, the content of the component (b) being 1.0 to 50 wt %, and preferably 1.0 to 30 wt %, and the content of the component (c) being 1.0 to 50 wt %, and preferably 1.0 to 30 wt %.

Any of the organoaluminum compounds mentioned above as the component (d) are used as the organoaluminum compound (B) used when producing the olefin polymerization catalyst according to one embodiment of the invention. Triethylaluminum or triisobutylaluminum is preferably used as the organoaluminum compound (B).

When producing the olefin polymerization catalyst according to one embodiment of the invention, an external electron donor compound (C) (hereinafter may be referred to as (component (C)") may be used in addition to the components (A) and (B). Note that high activity and high stereoregularity can be maintained even if the component (C) is not used when producing the olefin polymerization catalyst. Any of the electron donor compounds that may be used to produce the solid catalyst component may be used as the component (C). Specific examples of the component (C) include ethers such as 9,9-bis(methoxymethyl)fluorene, 2-isopropyl-2-isopentyl-1, 3-dimethoxypropane, 2,2-diisobutyl-1,3-dimethoxypropane, 2,2-dicyclohexyl-1,3-dimethoxypropane, 2,2-bis(cyclohexylmethyl)-1,3-dimethoxypropane, 2-cyclohexyl-2-isopropyl-1,3-dimethoxypropane, 2-isopropyl-2-sec-butyl-1,3-dimethoxypropane, 2,2-diphenyl-1,3-dimethoxypropane, and 2-cyclopentyl-2-isopropyl-1,3-dimethoxypropane, esters such as methyl benzoate and ethyl benzoate, 2,6-substituted piperidines such as 2,2,6,6-tetramethylpiperidine, 2,5-substituted piperidines, substituted methylenediamines such as N,N,N',N'-tetramethylmethylenediamine, organosilicon compounds, and the aminosilane compounds used as the component (b).

An organosilicon compound shown by the following general formula (6) may be used as the component (C).

$$R^9_q Si(OR^{10})_{4-q} \quad (6)$$

wherein $R^9$ individually represent an alkyl group having 1 to 12 carbon atoms, a cycloalkyl group, a phenyl group, a vinyl group, an allyl group, an aralkyl group, a linear or branched alkylamino group, or a polycyclic amino group, $R^{10}$ individually represent an alkyl group having 1 to 4 carbon atoms, a cycloalkyl group, a phenyl group, a vinyl group, an allyl group, or an aralkyl group, and q is an integer from 0 to 3.

Examples of the organosilicon compound shown by the general formula (6) include alkylalkoxysilanes, alkyl(cycloalkyl)alkoxysilanes, cycloalkylalkoxysilanes, phenylalkoxysilanes, alkyl(phenyl)alkoxysilanes, alkyl(dialkylamino)alkoxysilanes, (dialkylamino)alkoxysilanes, cycloalkyl (dialkylamino)alkoxysilanes, alkyl(dicycloalkylamino) alkoxysilanes, polycyclic aminoalkoxysilanes, alkyl (polycyclic amino)alkoxysilanes, and the like.

$R^9$ in the general formula (6) is preferably a methyl group, an ethyl group, an isopropyl group, an isobutyl group, a t-butyl group, a cyclopentyl group, or a cyclohexyl group. It is particularly preferable that a carbon atom directly bonded to Si be a secondary carbon atom or a tertiary carbon atom. A dialkoxysilane wherein q is 2 is also preferable.

Specific examples of the organosilicon compound (C) include di-n-propyldimethoxysilane, diisopropyldimethoxysilane, di-n-butyldimethoxysilane, di-n-butyldiethoxysilane, t-butyl(methyl)dimethoxysilane, t-butyl(ethyl) dimethoxysilane, dicyclohexyldimethoxysilane, cyclohexyl (methyl)dimethoxysilane, dicyclopentyldimethoxysilane, cyclopentyl(methyl)diethoxysilane, cyclopentyl(ethyl) dimethoxysilane, cyclopentyl(cyclohexyl)dimethoxysilane, 3-methylcyclohexyl(cyclopentyl)dimethoxysilane, 4-methylcyclohexyl(cyclopentyl)dimethoxysilane, 3,5-dimethylcyclohexyl(cyclopentyl)dimethoxysilane, bis(diethylamino) dimethoxysilane, bis(di-n-propylamino)dimethoxysilane, bis(di-n-butylamino)dimethoxysilane, bis(di-t-butylamino) dimethoxysilane, bis(dicyclopentylamino)dimethoxysilane, bis(dicyclohexylamino)dimethoxysilane, bis(di-2-methylcyclohexylamino)dimethoxysilane, bis(isoquinolino) dimethoxysilane, bis(quinolino)dimethoxysilane, bis(ethyl-n-propylamino)dimethoxysilane, bis(ethylisopropylamino) dimethoxysilane, bis(ethyl-n-butylamino)dimethoxysilane, bis(ethylisobutylamino)dimethoxysilane, bis(ethyl-t-butylamino)dimethoxysilane, bis(isobutyl-n-propylamino) dimethoxysilane, bis(ethylcyclopentylamino)dimethoxysilane, bis(ethylcyclohexylamino)dimethoxysilane, ethyl (diethylamino)dimethoxysilane, n-propyl (diisopropylamino)dimethoxysilane, isopropyl(di-t-butylamino)dimethoxysilane, cyclohexyl(diethylamino) dimethoxysilane, ethyl(di-t-butylamino)dimethoxysilane, ethyl(isoquinolino)dimethoxysilane, n-propyl(isoquinolino) dimethoxysilane, isopropyl(isoquinolino)dimethoxysilane, n-butyl(isoquinolino)dimethoxysilane, ethyl(quinolino) dimethoxysilane, n-propyl(quinolino)dimethoxysilane, isopropyl(quinolino)dimethoxysilane, n-butyl(quinolino) dimethoxysilane, bis(diethylamino)diethoxysilane, bis(di-n-propylamino)diethoxysilane, bis(di-n-butylamino) diethoxysilane, bis(di-t-butylamino)diethoxysilane, bis (dicyclopentylamino)diethoxysilane, bis (dicyclohexylamino)diethoxysilane, bis(di-2-methylcyclohexylamino)diethoxysilane, bis(diisoquinolino) diethoxysilane, bis(diquinolino)diethoxysilane, bis(ethyl-n-propylamino)diethoxysilane, bis(ethylisopropylamino) diethoxysilane, bis(ethyl-n-butylamino)diethoxysilane, bis (ethyl-isobutylamino)diethoxysilane, bis(ethyl-t-butylamino)diethoxysilane, bis(isobutyl-n-propylamino) diethoxysilane, bis(ethylcyclopentylamino)diethoxysilane, bis(ethylcyclohexylamino)diethoxysilane, n-propyl(diisopropylamino)diethoxysilane, ethyl(isoquinolino)diethoxysilane, n-propyl(isoquinolino)diethoxysilane, isopropyl(isoquinolino)diethoxysilane, n-butyl(isoquinolino) diethoxysilane, ethyl(quinolino)diethoxysilane, n-propyl (quinolino)diethoxysilane, isopropyl(quinolino) diethoxysilane, n-butyl(quinolino)diethoxysilane, thexyltrimethoxysilane, diethylaminotrimethoxysilane, di-n-propylaminotrimethoxysilane, di-n-butylaminotrimethoxysilane, di-t-butylaminotrimethoxysilane, dicyclopentylaminotrimethoxysilane, dicyclohexylaminotrimethoxysilane, di-2-methylcyclohexylaminotrimethoxysilane, isoquinolinotrimethoxysilane, quinolinotrimethoxysilane, diethylaminotriethoxysilane, di-n-propylaminotriethoxysilane, di-n-butylaminotriethoxysilane, ethyl-t-butylaminotriethoxysilane, ethyl-sec-butylaminotriethoxysilane, dicyclopentylaminotriethoxysilane, dicyclohexylaminotriethoxysilane, di-2-methylcyclohexylaminotriethoxysilane, isoquinolinotriethoxysilane, and quinolinotriethoxysilane. Among these, t-butyl(methyl)dimethoxysilane, t-butyl(ethyl)dimethoxysilane, dicyclohexyldimethoxysilane, cyclohexyl(methyl)dimethoxysilane, dicyclopentyldimethoxysilane are preferable. These organosilicon compounds (C) may be used either individually or in combination.

An olefin is polymerized or copolymerized in the presence of the olefin polymerization catalyst according to one embodiment of the invention. Examples of the olefin include ethylene, propylene, 1-butene, 1-pentene, 4-methyl-1-pentene, vinylcyclohexane, and the like. These olefins may be used either individually or in combination. Among these, ethylene, propylene, and 1-butene are suitably used. Note that propylene is particularly preferable. Propylene may be copolymerized with another olefin. Examples of the olefin copolymerized with propylene include ethylene, 1-butene, 1-pentene, 4-methyl-1-pentene, vinylcyclohexane, and the like. These olefins may be used either individually or in combination. Among these, ethylene and 1-butene are suitably used. Propylene is typically copolymerized with another olefin by random copolymerization that polymerizes propylene and a small amount of ethylene (comonomer) in a single stage, or propylene-ethylene block copolymerization that polymerizes propylene in a first stage (first polymerization tank), and copolymerizes propylene and ethylene in a second stage (second polymerization tank) or multiple stages (multi-stage polymerization tank). The catalyst according to one embodiment of the invention that includes the component (A) and the component (B) or the component (C) is effective for the above random copolymerization and block copolymerization, improves the catalytic activity and the stereoregularity, and produces a polymer or a copolymer having a broad molecular weight distribution.

The components are used in an arbitrary ratio insofar as the effects of the invention are not adversely affected. The component (B) is normally used in an amount of 1 to 2000 mol, and preferably 50 to 1000 mol, per mol of titanium contained in the component (A). The component (C) is normally used in an amount of 0.001 to 10 mol, preferably 0.002 to 2 mol, and particularly preferably 0.002 to 0.5 mol, per mol of the component (B).

The components may be caused to come in contact with each other in an arbitrary order. Note that it is desirable to add the organoaluminum compound (B) to the polymerization system, and cause the solid catalyst component (A) to come in contact with the organoaluminum compound (B). When using the component (C), it is desirable to add the organoaluminum compound (B) to the polymerization system, cause the component (C) to come in contact with the organoaluminum compound (B), and then cause the solid catalyst component (A) to come in contact with the mixture.

The polymerization method according to one embodiment of the invention may be carried out in the presence or absence of an organic solvent. An olefin monomer such as propylene may be used in a gaseous state or a liquid state. The polymerization temperature is 200° C. or less, and preferably at 100° C. or less, and the polymerization pressure is 10 MPa or less, and preferably 6 MPa or less. The polymerization reaction may be carried out by continuous polymerization or batch polymerization. The polymerization reaction may be carried out in a single stage, or may be carried out in two or more stages.

When polymerizing an olefin using the catalyst that includes the solid catalyst component (A), the component (B), and the optional component (C) (hereinafter may be referred to as "main polymerization"), it is desirable to perform preliminary polymerization in order to improve the catalytic activity, the stereoregularity, the particle properties of the resulting polymer, and the like. The olefin subjected to main polymerization or a monomer such as styrene may be used for preliminary polymerization.

The components and the monomer may be caused to come in contact with each other in an arbitrary order during preliminary polymerization. Note that it is preferable to add the component (B) to a preliminary polymerization system in an inert gas atmosphere or an olefin gas atmosphere, cause the solid catalyst component (A) to come contact with the component (B), and then cause the olefin (e.g., propylene) and/or one or more additional olefins to come contact with the mixture. When performing preliminary polymerization using the component (C), it is desirable to add the component (B) to a preliminary polymerization system in an inert gas atmosphere or an olefin gas atmosphere, cause the component (C) to come into contact with the component (B), cause the solid catalyst component (A) to come into contact with the mixture, and then cause the olefin (e.g., propylene) and/or one or more additional olefins to come into contact with the mixture.

When polymerizing an olefin in the presence of the olefin polymerization catalyst produced according to one embodiment of the invention, an olefin polymer having a broad molecular weight distribution can be produced while maintaining high yield and high stereoregularity as compared with the case of using a known catalyst.

The invention is further described below by way of examples. Note that the invention is not limited to the following examples.

Example 1

Production of Solid Component

A 500 ml round-bottom flask equipped with a stirrer (the internal atmosphere of the round-bottom flask had been sufficiently replaced with nitrogen gas) was charged with 20 g of diethoxymagnesium and 100 ml of toluene to prepare a suspension. The suspension was added to a 500 ml round-bottom flask equipped with a stirrer (the internal atmosphere of the round-bottom flask had been sufficiently replaced with nitrogen gas) that had been charged with a solution of 60 ml of titanium tetrachloride in 40 ml of toluene. The suspension was reacted at 5° C. for 1 hour. After the addition of 8.4 ml of n-butyl phthalate, the mixture was heated to 110° C., and subjected to a primary reaction for 4 hours with stirring. After completion of the reaction, the product was washed four times with 150 ml of toluene (80° C.). After the addition of 110 ml of toluene and 40 ml of titanium tetrachloride, the mixture was subjected to a secondary reaction at 110° C. for 2 hours with stirring. The intermediate washing operation and the secondary reaction operation were repeated once. The resulting product was washed seven times with 140 ml of heptane (40° C.), filtered, and dried to obtain a powdery solid component. The titanium content in the solid component was 2.9 wt %.

<Production of Solid Catalyst Component>

10 g of the solid component obtained as described above was suspended in 100 ml of heptane. 11 mmol of divinyldimethylsilane was added to the suspension, and reacted at 70° C. for 2 hours. After completion of the reaction, the reaction solution was cooled to 30° C. After the addition of 8.5 mmol of t-butylmethylbis(ethylamino)silane and 29 mmol of triethylaluminum diluted with heptane to the reaction solution, the mixture was stirred at 30° C. for 2 hours. The resulting product was washed seven times with 100 ml of heptane (30° C.) to obtain a solid catalyst component. The titanium content in the solid catalyst component was 1.8 wt %.

<Production of Polymerization Catalyst and Polymerization>

A 2.0 l autoclave equipped with a stirrer (the internal atmosphere of the autoclave had been completely replaced with nitrogen gas) was charged with 1.32 mmol of triethylaluminum and the solid catalyst component (amount of titanium atoms: 0.0026 mmol) to produce a polymerization catalyst. After the addition of 4 l of hydrogen gas and 1.4 l of liquefied propylene, preliminary polymerization was carried out at 20° C. for 5 minutes. The mixture was then heated to effect main polymerization (70° C., 1 hour). The catalytic activity, and the melt flow rate (melt index (MI), g-PP/10 min) and the xylene-soluble content (23° C.) XS, wt %) of the resulting polymer were measured. The results are shown in Table 1.

The catalytic activity that indicates the amount (F) (g) of polymer produced per gram of the solid catalyst component within one hour was calculated by the following expression.

Catalytic activity=polymer $(F)(g)$/solid catalyst component$(g)$/1 hour

The xylene-soluble content (XS, wt %) of the polymer was determined as follows. Specifically, 4.0 g of the polymer was added to 200 ml of p-xylene, and dissolved over 2 hours at the boiling point (138° C.) of toluene. The solution was then cooled to 23° C., and an insoluble component and a soluble component were separated by filtration. After evaporating the solvent from the soluble component, the residue was dried (heated) to obtain a xylene-soluble component (polymer). The xylene-soluble content (XS, wt %) was indicated by a value relative to the amount (F) of the polymer.

The melt index (MI) that indicates the melt flow rate of the polymer was determined in accordance with ASTM D1238 and JIS K 7210.

Example 2

An experiment was performed in the same manner as in Example 1, except for using 17 mmol of divinyldimethylsilane, 26 mmol of t-butylmethylbis(ethylamino)silane, and 78 mmol of triethylaluminum. The results are shown in Table 1.

Example 3

An experiment was performed in the same manner as in Example 1, except for using dicyclopentylbis(ethylamino)silane instead of t-butylmethylbis(ethylamino)silane. The results are shown in Table 1.

Example 4

An experiment was performed in the same manner as in Example 1, except for using t-butylcyclopentylbis(ethylamino)silane instead of t-butylmethylbis(ethylamino)silane. The results are shown in Table 1.

Example 5

An experiment was performed in the same manner as in Example 1, except for using t-butylaminoethylbis(ethylamino)silane instead of t-butylmethylbis(ethylamino)silane. The results are shown in Table 1.

Example 6

An experiment was performed in the same manner as in Example 1, except for using cyclopentylaminocyclopentylbis(ethylamino)silane instead of t-butylmethylbis(ethylamino)silane. The results are shown in Table 1.

Example 7

An experiment was performed in the same manner as in Example 2, except for using diallyldimethylsilane instead of divinyldimethylsilane. The results are shown in Table 1.

Example 8

An experiment was performed in the same manner as in Example 2, except for using divinyldichlorosilane instead of divinyldimethylsilane. The results are shown in Table 1.

Example 9

An experiment was performed in the same manner as in Example 2, except for using diallyldichlorosilane instead of divinyldimethylsilane. The results are shown in Table 1.

Example 10

An experiment was performed in the same manner as in Example 2, except for using vinyltrimethylsilane instead of divinyldimethylsilane. The results are shown in Table 1.

Example 11

An experiment was performed in the same manner as in Example 2, except for using vinylallyldimethylsilane instead of divinyldimethylsilane. The results are shown in Table 1.

Example 12

An experiment was performed in the same manner as in Example 2, except for using trivinylmethylsilane instead of divinyldimethylsilane. The results are shown in Table 1.

Example 13

An experiment was performed in the same manner as in Example 2, except for using diethyl diisobutylmalonate instead of di-n-butyl phthalate. The results are shown in Table 1.

Example 14

An experiment was performed in the same manner as in Example 2, except for using dimethyl diisobutylmalonate instead of di-n-butyl phthalate. The results are shown in Table 1.

Example 15

An experiment was performed in the same manner as in Example 2, except for using di-n-butyl tetrahydrophthalate instead of di-n-butyl phthalate. The results are shown in Table 1.

Example 16

An experiment was performed in the same manner as in Example 2, except for using diethyl maleate instead of di-n-butyl phthalate. The results are shown in Table 1.

Example 17

An experiment was performed in the same manner as in Example 2, except for using diethyl isopropylmaleate instead of di-n-butyl phthalate. The results are shown in Table 1.

Example 18

An experiment was performed in the same manner as in Example 2, except for using diethyl diisopropylsuccinate instead of di-n-butyl phthalate. The results are shown in Table 1.

Example 19

An experiment was performed in the same manner as in Example 2, except for using diethyl diisobutylglutarate instead of di-n-butyl phthalate. The results are shown in Table 1.

Example 20

An experiment was performed in the same manner as in Example 2, except for using di-n-butyl cyclohexane-1,1-dicarboxylate instead of di-n-butyl phthalate. The results are shown in Table 1.

Example 21

An experiment was performed in the same manner as in Example 2, except for using di-n-butyl cyclohexane-1,2-dicarboxylate instead of di-n-butyl phthalate. The results are shown in Table 1.

Example 22

Production of Solid Component

A 1000 ml round-bottom flask equipped with a stirrer (the internal atmosphere of the round-bottom flask had been sufficiently replaced with nitrogen gas) was charged with 32 g of magnesium turnings for producing a Grignard reagent. A mixture of 120 g of butyl chloride and 500 ml of dibutyl ether was then added dropwise to the flask at 50° C. over 4 hours. The mixture was then reacted at 60° C. for 1 hour. After completion of the reaction, the reaction solution was cooled to room temperature. A solid component was then removed by filtration to obtain a magnesium compound solution. A 500 ml round-bottom flask equipped with a stirrer (the internal atmosphere of the round-bottom flask had been sufficiently replaced with nitrogen gas) was charged with 240 ml of hexane, 5.4 g of tetrabuthoxytitanium, and 61.4 g of tetraethoxysilane to obtain a homogeneous solution. 150 ml of the magnesium compound solution was added dropwise to the solution (i.e., the components were reacted) at 5° C. over 4 hours. The mixture was then stirred at room temperature for 1 hour. The reaction solution was filtered at room temperature to remove the liquid. The residual solid was washed eight times with 240 ml of hexane, and dried under reduced pressure to obtain a solid product. 8.6 g of the solid product was added to a 100 ml round-bottom flask equipped with a stirrer (the internal atmosphere of the round-bottom flask had been sufficiently replaced with nitrogen gas). After the addition of 48 ml of toluene and 5.8 ml of diisobutyl phthalate, the mixture was reacted at 95° C. for 1 hour. After removing the liquid by filtration, the residual solid was washed eight times with 85 ml of toluene. After the addition of 21 ml of toluene, 0.48 ml of diisobutyl phthalate, and 12.8 ml of titanium tetrachloride, the mixture was reacted at 95° C. for 8 hours. After completion of the reaction, the solid was separated at 95° C., washed twice with 48 ml of toluene, treated with a mixture of diisobutyl phthalate and titanium tetrachloride under the above conditions, washed eight times with 48 ml of hexane, filtered, and dried to obtain a powdery solid component. The titanium content in the resulting solid component was 2.1 wt %.

<Production of Solid Catalyst Component>

A solid catalyst component was produced in the same manner as in Example 1, except for using the solid component produced as described above.

<Production of Polymerization Catalyst and Polymerization>

A polymerization catalyst was produced, and a polymerization operation was performed in the same manner as in Example 1, except for using the solid catalyst component produced as described above. The results are shown in Table 1.

Example 23

Production of Solid Component

A 500 ml round-bottom flask equipped with a stirrer (the internal atmosphere of the round-bottom flask had been sufficiently replaced with nitrogen gas) was charged with 4.76 g of anhydrous magnesium chloride, 25 ml of decane, and 23.4 ml of 2-ethylhexyl alcohol. The mixture was reacted at 130° C. for 2 hours to obtain a homogeneous solution. After the addition of 1.11 g of phthalic anhydride to the solution, the mixture was reacted at 130° C. for 1 hour. The solution was added dropwise to a 500 ml round-bottom flask equipped with a stirrer (the internal atmosphere of the round-bottom flask had been sufficiently replaced with nitrogen gas) that had been charged with 200 ml of titanium tetrachloride (−20° C.) over 1 hour. The mixture was heated to 110° C. over 4 hours. 2.68 ml of diisobutyl phthalate was added to the mixture, and reacted for 2 hours. After completion of the reaction, the liquid was removed by filtration. The residual solid was washed with decane and hexane at 110° C. until free titanium compounds were not detected, filtered, and dried to obtain a powdery solid component. The titanium content in the solid component was 3.1 wt %.

<Production of Solid Catalyst Component>

A solid catalyst component was produced in the same manner as in Example 1, except for using the solid component produced as described above.

<Production of Polymerization Catalyst and Polymerization>

A polymerization catalyst was produced, and a polymerization operation was performed in the same manner as in Example 1, except for using the solid catalyst component produced as described above. The results are shown in Table 1.

COMPARATIVE EXAMPLE 1

An experiment was performed in the same manner as in Example 1, except for using cyclohexylmethyldimethoxysilane instead of t-butylmethylbis(ethylamino)silane. The results are shown in Table 1.

COMPARATIVE EXAMPLE 2

An experiment was performed in the same manner as in Example 1, except for using dicyclopenthyldimethoxysilane instead of t-butylmethylbis(ethylamino)silane. The results are shown in Table 1.

COMPARATIVE EXAMPLE 3

An experiment was performed in the same manner as in Example 1, except for using t-butylmethyldimethoxysilane instead of t-butylmethylbis(ethylamino)silane, and using diallyldimethylsilane instead of divinyldimethylsilane. The results are shown in Table 1.

COMPARATIVE EXAMPLE 4

A polymerization catalyst was produced in the same manner as in Example 1, except for using the solid component instead of the solid catalyst component, and using 0.132 mmol of t-butylmethylbis(ethylamino)silane. Specifically, the solid catalyst component was not used in Comparative Example 4, and t-butylmethylbis(ethylamino)silane was used as the external electron donor compound. The results are shown in Table 1.

COMPARATIVE EXAMPLE 5

An experiment was performed in the same manner as in Example 1, except for using diethylaminotriethoxysilane instead of t-butylmethylbis(ethylamino)silane. The results are shown in Table 1.

TABLE 1

|  | Activity (g-pp/g, catalytic activity) | MFR (g/10 min) | XS (wt %) |
| --- | --- | --- | --- |
| Example 1 | 55800 | 260 | 2.6 |
| Example 2 | 63600 | 290 | 1.8 |
| Example 3 | 59300 | 200 | 1.6 |
| Example 4 | 56100 | 180 | 2.2 |
| Example 5 | 51000 | 140 | 0.9 |
| Example 6 | 52100 | 110 | 0.8 |
| Example 7 | 59900 | 330 | 2.1 |
| Example 8 | 64800 | 280 | 1.9 |
| Example 9 | 58500 | 310 | 2.2 |
| Example 10 | 61000 | 300 | 2.3 |
| Example 11 | 61900 | 330 | 2.3 |
| Example 12 | 65400 | 260 | 1.8 |
| Example 13 | 56900 | 400 | 2.9 |
| Example 14 | 51000 | 490 | 2.1 |
| Example 15 | 44300 | 250 | 1.6 |
| Example 16 | 46600 | 420 | 3.8 |
| Example 17 | 49200 | 360 | 3.0 |
| Example 18 | 48000 | 380 | 3.5 |
| Example 19 | 63100 | 270 | 2.5 |
| Example 20 | 46900 | 440 | 3.7 |
| Example 21 | 49200 | 290 | 3.4 |
| Example 22 | 48300 | 440 | 3.2 |
| Example 23 | 46600 | 470 | 3.4 |
| Comparative Example 1 | 42500 | 35 | 2.1 |
| Comparative Example 2 | 59800 | 18 | 1.8 |
| Comparative Example 3 | 56800 | 12 | 2.2 |
| Comparative Example 4 | 47800 | 80 | 1.9 |
| Comparative Example 5 | 34000 | 100 | 1.9 |

Example 24

An experiment was performed in the same manner as in Example 1, except for using 4.3 mmol of t-butylmethylbis(ethylamino)silane and 4.2 mmol of dicyclopenthyldimethoxysilane instead of 8.5 mmol of t-butylmethylbis(ethylamino)silane. The results are shown in Table 2.

Example 25

An experiment was performed in the same manner as in Example 24, except for using 17 mmol of divinyldimethylsilane, 13.2 mmol of t-butylmethylbis(ethylamino)silane, 12.8 mmol of dicyclopenthyldimethoxysilane, and 78 mmol of triethylaluminum. The results are shown in Table 2.

Example 26

An experiment was performed in the same manner as in Example 24, except for using dicyclopentylbis(ethylamino)silane instead of t-butylmethylbis(ethylamino)silane. The results are shown in Table 2.

Example 27

An experiment was performed in the same manner as in Example 24, except for using t-butylcyclopentylbis(ethylamino)silane instead of t-butylmethylbis(ethylamino)silane. The results are shown in Table 2.

Example 28

An experiment was performed in the same manner as in Example 24, except for using t-butylaminoethylbis(ethylamino)silane instead of t-butylmethylbis(ethylamino)silane. The results are shown in Table 2.

Example 29

An experiment was performed in the same manner as in Example 24, except for using cyclopentylaminocyclopentylbis(ethylamino)silane instead of t-butylmethylbis(ethylamino)silane. The results are shown in Table 2.

Example 30

An experiment was performed in the same manner as in Example 24, except that divinyldimethylsilane was not used. The results are shown in Table 2.

Example 31

An experiment was performed in the same manner as in Example 25, except for using diallyldimethylsilane instead of divinyldimethylsilane. The results are shown in Table 2.

Example 32

An experiment was performed in the same manner as in Example 25, except for using divinyldichlorosilane instead of divinyldimethylsilane. The results are shown in Table 2.

Example 33

An experiment was performed in the same manner as in Example 25, except for using diallyldichlorosilane instead of divinyldimethylsilane. The results are shown in Table 2.

Example 34

An experiment was performed in the same manner as in Example 25, except for using vinyltrimethylsilane instead of divinyldimethylsilane. The results are shown in Table 2.

Example 35

An experiment was performed in the same manner as in Example 25, except for using vinylallyldimethylsilane instead of divinyldimethylsilane. The results are shown in Table 2.

Example 36

An experiment was performed in the same manner as in Example 25, except for using trivinylmethylsilane instead of divinyldimethylsilane. The results are shown in Table 2.

Example 37

An experiment was performed in the same manner as in Example 25, except for using diethyl diisobutylmalonate instead of di-n-butyl phthalate. The results are shown in Table 2.

Example 38

An experiment was performed in the same manner as in Example 25, except for using dimethyl diisobutylmalonate instead of di-n-butyl phthalate. The results are shown in Table 2.

Example 39

An experiment was performed in the same manner as in Example 25, except for using di-n-butyl tetrahydrophthalate instead of di-n-butyl phthalate. The results are shown in Table 2.

Example 40

An experiment was performed in the same manner as in Example 25, except for using diethyl maleate instead of di-n-butyl phthalate. The results are shown in Table 2.

Example 41

An experiment was performed in the same manner as in Example 25, except for using diethyl isopropylmaleate instead of di-n-butyl phthalate. The results are shown in Table 2.

Example 42

An experiment was performed in the same manner as in Example 25, except for using diethyl diisopropylsuccinate instead of di-n-butyl phthalate. The results are shown in Table 2.

Example 43

An experiment was performed in the same manner as in Example 25, except for using diethyl diisobutylglutarate instead of di-n-butyl phthalate. The results are shown in Table 2.

Example 44

An experiment was performed in the same manner as in Example 25, except for using di-n-butyl cyclohexane-1,1-dicarboxylate instead of di-n-butyl phthalate. The results are shown in Table 2.

Example 45

An experiment was performed in the same manner as in Example 25, except for using di-n-butyl cyclohexane-1,2-dicarboxylate instead of di-n-butyl phthalate. The results are shown in Table 2.

Example 46

Production of Solid Catalyst Component

A solid catalyst component was produced in the same manner as in Example 24, except for using the solid component obtained in Example 22.

<Production of Polymerization Catalyst and Polymerization>

A polymerization catalyst was produced, and a polymerization operation was performed in the same manner as in Example 24, except for using the solid catalyst component produced as described above. The results are shown in Table 2.

Example 47

Production of Solid Catalyst Component

A solid catalyst component was produced in the same manner as in Example 24, except for using the solid component obtained in Example 23.

<Production of Polymerization Catalyst and Polymerization>

A polymerization catalyst was produced, and a polymerization operation was performed in the same manner as in Example 24, except for using the solid catalyst component produced as described above. The results are shown in Table 2.

COMPARATIVE EXAMPLE 6

An experiment was performed in the same manner as in Example 24, except for using cyclohexylmethyldimethoxysilane instead of t-butylmethylbis(ethylamino)silane. The results are shown in Table 2.

COMPARATIVE EXAMPLE 7

An experiment was performed in the same manner as in Example 24, except for using dicyclopenthyldimethoxysilane instead of t-butylmethylbis(ethylamino)silane. The results are shown in Table 2.

COMPARATIVE EXAMPLE 8

An experiment was performed in the same manner as in Example 24, except for using t-butylmethyldimethoxysilane instead of t-butylmethylbis(ethylamino)silane, and using diallyldimethylsilane instead of divinyldimethylsilane. The results are shown in Table 2.

COMPARATIVE EXAMPLE 9

An experiment was performed in the same manner as in Example 1, except for producing a solid catalyst component using diethylaminotriethoxysilane instead of t-butylmethylbis(ethylamino)silane. The results are shown in Table 2.

TABLE 2

|  | Activity (g-pp/g, catalytic activity) | MFR (g/10 min) | XS (wt %) |
|---|---|---|---|
| Example 24 | 55200 | 160 | 1.7 |
| Example 25 | 62600 | 140 | 1.4 |
| Example 26 | 60200 | 120 | 1.3 |
| Example 27 | 52000 | 130 | 1.6 |
| Example 28 | 53500 | 110 | 1.0 |
| Example 29 | 52800 | 100 | 0.8 |
| Example 30 | 52300 | 170 | 1.5 |
| Example 31 | 61900 | 140 | 1.4 |
| Example 32 | 66800 | 110 | 1.3 |
| Example 33 | 58600 | 140 | 1.7 |
| Example 34 | 57100 | 160 | 1.7 |
| Example 35 | 55800 | 120 | 1.5 |
| Example 36 | 60100 | 110 | 1.4 |
| Example 37 | 57000 | 180 | 1.8 |
| Example 38 | 51300 | 210 | 2.0 |
| Example 39 | 54300 | 120 | 1.1 |
| Example 40 | 56600 | 170 | 2.0 |
| Example 41 | 49900 | 170 | 1.7 |
| Example 42 | 41000 | 200 | 2.7 |
| Example 43 | 60300 | 240 | 2.4 |
| Example 44 | 39900 | 250 | 2.8 |
| Example 45 | 39200 | 210 | 3.0 |
| Example 46 | 38300 | 200 | 2.0 |
| Example 47 | 40600 | 220 | 2.7 |
| Comparative Example 6 | 40900 | 50 | 3.2 |
| Comparative Example 7 | 49600 | 32 | 1.9 |
| Comparative Example 8 | 63300 | 15 | 1.1 |
| Comparative Example 9 | 46500 | 38 | 1.2 |

Example 48

An experiment was performed in the same manner as in Example 1, except for using 6 mmol of divinyldimethylsilane, 6 mmol of t-butylmethylbis(ethylamino)silane, and 20 mmol of triethylaluminum. Specifically, the amounts (molar ratio) of divinyldimethylsilane, t-butylmethylbis(ethylamino)silane, and triethylaluminum per mol of titanium atoms contained in the solid component were changed from 1.8, 1.3, and 4.8 in Example 1 to 0.98, 0.98, and 3.3, respectively (titanium content in solid catalyst component (10 g): 2.9 wt %×10 g=0.29 g/47.88=6.1 mmol). The results are shown in Table 3.

Example 49

An experiment was performed in the same manner as in Example 1, except for using 15 mmol of divinyldimethylsilane, 15 mmol of t-butylmethylbis(ethylamino)silane, and 40 mmol of triethylaluminum (respectively 2.5, 2.5, and 6.6 per mol of titanium atoms contained in solid component (molar ratio)). The results are shown in Table 3.

Example 50

An experiment was performed in the same manner as in Example 1, except for using 30 mmol of divinyldimethylsilane, 30 mmol of t-butylmethylbis(ethylamino)silane, and 40 mmol of triethylaluminum (respectively 4.9, 4.9, and 6.6 per mol of titanium atoms contained in solid component (molar ratio)). The results are shown in Table 3.

Example 51

An experiment was performed in the same manner as in Example 49, except for using dicyclopentylbis(ethylamino)silane instead of t-butylmethylbis(ethylamino)silane. The results are shown in Table 3.

Example 52

An experiment was performed in the same manner as in Example 50, except for using dicyclopentylbis(ethylamino)silane instead of t-butylmethylbis(ethylamino)silane. The results are shown in Table 3.

Example 53

An experiment was performed in the same manner as in Example 1, except for using 6 mmol of divinyldimethylsilane, 6 mmol of t-butylmethylbis(ethylamino)silane, 2.5 mmol of dicyclopenthyldimethoxysilane, and 20 mmol of triethylaluminum (respectively 0.98, 0.98, 0.36, and 3.3 per mol of titanium atoms contained in solid component (molar ratio)) instead of divinyldimethylsilane, t-butylmethylbis(ethylamino)silane, and triethylaluminum. The results are shown in Table 3.

Example 54

An experiment was performed in the same manner as in Example 1, except for using 15 mmol of divinyldimethylsilane, 12.5 mmol of t-butylmethylbis(ethylamino)silane, 2.5 mmol of dicyclopenthyldimethoxysilane, and 40 mmol of triethylaluminum (respectively 2.5, 2.0, 1.2, and 6.6 per mol of titanium atoms contained in solid component (molar ratio)) instead of divinyldimethylsilane, t-butylmethylbis(ethylamino)silane, and triethylaluminum. The results are shown in Table 3.

Example 55

An experiment was performed in the same manner as in Example 1, except for using 30 mmol of divinyldimethylsilane, 20 mmol of t-butylmethylbis(ethylamino)silane, 10 mmol of dicyclopenthyldimethoxysilane, and 40 mmol of triethylaluminum (respectively 4.9, 3.3, 1.6, and 6.6 per mol of titanium atoms contained in solid component (molar ratio)) instead of divinyldimethylsilane, t-butylmethylbis(ethylamino)silane, and triethylaluminum. The results are shown in Table 3.

Example 56

An experiment was performed in the same manner as in Example 54, except for using dicyclopentylbis(ethylamino)silane instead of t-butylmethylbis(ethylamino)silane, and using t-butylmethyldimethoxysilane instead of dicyclopenthyldimethoxysilane. The results are shown in Table 3.

Example 57

An experiment was performed in the same manner as in Example 55, except for using dicyclopentylbis(ethylamino)silane instead of t-butylmethylbis(ethylamino)silane, and using t-butylmethyldimethoxysilane instead of dicyclopenthyldimethoxysilane. The results are shown in Table 3.

TABLE 3

|  | Activity (g-pp/g, catalytic activity) | MFR (g/10 min) | XS (wt %) |
|---|---|---|---|
| Example 48 | 44200 | 170 | 2.9 |
| Example 49 | 53800 | 210 | 2.2 |
| Example 50 | 49500 | 240 | 1.7 |
| Example 51 | 51900 | 200 | 2.0 |
| Example 52 | 48600 | 160 | 1.6 |
| Example 53 | 43200 | 100 | 2.0 |
| Example 54 | 53300 | 180 | 2.2 |
| Example 55 | 52900 | 150 | 1.6 |
| Example 56 | 53300 | 180 | 2.2 |
| Example 57 | 52900 | 150 | 1.6 |

As is clear from the results shown in Tables 1 to 3, an olefin polymer having a high MFR, high polymerization activity, and high stereoregularity can be obtained by polymerizing an olefin using the solid catalyst component according to one embodiment of the invention. In particular, a polymer having a high MFR, high polymerization activity, and high stereoregularity was obtained in the examples in which the active hydrogen-containing aminosilane compound was used as the internal electron donor compound as compared with Comparative Example 4 in which the active hydrogen-containing aminosilane compound was used as the external electron donor compound. The above results are surprising taking account of the fact that an active hydrogen-containing aminosilane compound has been considered to adversely affect titanium (active site) as a catalyst poison when used as a component of a solid catalyst component for olefin polymerization.

The invention claimed is:

1. A solid catalyst component for olefin polymerization produced by contacting with each other:
(a) a solid component that comprises magnesium, titanium, a halogen, and an electron donor;
(b) an aminosilane compound shown by formula (1)

$$R^1{}_n Si(NR^2 R^3)_{4-n} \quad (1)$$

wherein
each $R^1$ is independently a linear or branched alkyl group having from 1 to 20 carbon atoms, a substituted or unsubstituted cycloalkyl group, a vinyl group, an allyl group, an aralkyl group, a substituted or unsubstituted phenyl group, a substituted or unsubstituted benzyl group, or a substituted or unsubstituted naphthyl group,
each $R^2$ is independently a hydrogen atom, a linear or branched alkyl group having from 1 to 20 carbon atoms, a substituted or unsubstituted cycloalkyl group, a vinyl group, an allyl group, or an aralkyl group, each $R^3$ is independently a linear or branched alkyl group having from 1 to 20 carbon atoms, a substituted or unsubstituted cycloalkyl group, a vinyl group, an allyl group, or an aralkyl group,
$R^2$ and $R^3$ optionally bond to form a ring,
n is an integer from 0 to 3, and
at least one $NR^2R^3$ group is a secondary amino group comprising an N—H bond; and
(c) an organosilicon compound of formula (2-A)

$$[CH_2=CH-(CH_2)_l]_q SiR^4{}_{4-q} \quad (2\text{-}A)$$

wherein
each $R^4$ is independently a hydrogen atom, an alkyl group having from 1 to 20 carbon atoms, a cycloalkyl group, an aryl group, a vinyl group, or a halogen atom,
l is an integer from 0 to 5, and
q is an integer from 1 to 4,
with the proviso that if q is 1, at least one $R^4$ is an alkyl group having from 2 to 20 carbon atoms, a cycloalkyl group, an aryl group, a vinyl group, or a halogen atom.

2. The solid catalyst component of claim 1, produced by contacting with each other (a), (b), (c), and (d) an organoaluminum compound of formula (3):

$$R^7{}_r AlQ_{3-r} \quad (3)$$

wherein
$R^7$ is an alkyl group having from 1 to 4 carbon atoms,
Q is a hydrogen atom or a halogen atom, and
r is an integer from 1 to 3.

3. The solid catalyst component of claim 1, wherein the solid component (a) is produced by contacting:
(i) a magnesium compound;
(ii) a titanium compound; and
(iii) an electron donor compound.

4. The solid catalyst component of claim 1, wherein $R^1$ in formula (1) represents an alkyl group that comprises a secondary carbon atom or a tertiary carbon atom.

5. The solid catalyst component of claim 1, wherein the organosilicon compound of formula (2-A) is a diallyldialkylsilane.

6. An olefin polymerization catalyst, comprising:
(A) the solid catalyst component of claim 1; and
(B) an organoaluminum compound of formula (5), $$R^8{}_p AlQ_{3-p} \quad (5)$$

wherein
$R^8$ is an alkyl group having from 1 to 4 carbon atoms,
Q is a hydrogen atom or a halogen atom, and
p is an integer from 1 to 3.

7. The olefin polymerization catalyst of claim 6, further comprising, as an external electron donor compound, an organosilicon compound of formula (6), $$R^9{}_q Si(OR^{10})_{4-q} \quad (6)$$

wherein
each $R^9$ is independently an alkyl group having from 1 to 12 carbon atoms, a cycloalkyl group, a phenyl group, a vinyl group, an allyl group, an aralkyl group, a linear or branched alkylamino group, or a polycyclic amino group,
each $R^{10}$ is independently an alkyl group having from 1 to 4 carbon atoms, a cycloalkyl group, a phenyl group, a vinyl group, an allyl group, or an aralkyl group, and
q is an integer from 0 to 3.

8. A process for producing an olefin polymer, comprising:
polymerizing an olefin in the presence of the olefin polymerization catalyst of claim 6.

9. The process according to claim 8, wherein the olefin is propylene.

10. The solid catalyst component of claim 2, wherein the solid component (a) is produced by contacting:
(i) a magnesium compound;
(ii) a titanium compound; and
(iii) an electron donor compound.

11. The solid catalyst component of claim 2, wherein $R^1$ in formula (1) is an alkyl group comprising a secondary carbon atom or a tertiary carbon atom.

12. The solid catalyst component of claim 3, wherein $R^1$ in formula (1) is an alkyl group comprising a secondary carbon atom or a tertiary carbon atom.

13. The solid catalyst component of claim 2, wherein the organosilicon compound of formula (2-A) is a diallyldialkylsilane.

14. The solid catalyst component of claim 3, wherein the organosilicon compound of formula (2-A) is a diallyldialkylsilane.

15. The solid catalyst component of claim 4, wherein the organosilicon compound of formula (2-A) is a diallyldialkylsilane.

16. The solid catalyst component of claim 1, produced by contacting (a), (b), (c), and an organosilicon compound of formula (2-B)

$$R^5Si(OR^6)_{4-s} \quad (2\text{-}B)$$

wherein
$R^5$ is an alkyl group having from 1 to 12 carbon atoms, a cycloalkyl group, a phenyl group, a vinyl group, an allyl group, an aralkyl group, a linear or branched alkylamino group, or a polycyclic amino group,
each $R^6$ is independently a linear or branched alkyl group having from 1 to 4 carbon atoms, and
s is an integer from 0 to 3.

17. The solid catalyst component of claim 2, produced by contacting (a), (b), (c), (d), and an organosilicon compound of formula (2-B)

$$R^5Si(OR^6)_{4-s} \quad (2\text{-}B)$$

wherein
$R^5$ is an alkyl group having from 1 to 12 carbon atoms, a cycloalkyl group, a phenyl group, a vinyl group, an allyl group, an aralkyl group, a linear or branched alkylamino group, or a polycyclic amino group,
each $R^6$ is independently a linear or branched alkyl group having from 1 to 4 carbon atoms, and
s is an integer from 0 to 3.

18. The olefin polymerization catalyst of claim 6, comprising an external electron donor compound.

19. The olefin polymerization catalyst of claim 6, excluding an external electron donor compound.

* * * * *